(12) United States Patent
Nochta et al.

(10) Patent No.: US 8,522,341 B2
(45) Date of Patent: Aug. 27, 2013

(54) ACTIVE INTERVENTION IN SERVICE-TO-DEVICE MAPPING FOR SMART ITEMS

(75) Inventors: Zoltan Nochta, Karlsruhe (DE); Luciana Moreira Sa de Souza, Karlsruhe (DE); Stephan Haller, Karlsruhe (DE); Patrik Spiess, Karlsruhe (DE)

(73) Assignee: SAP AG, Walldorf (DE)

( * ) Notice: Subject to any disclaimer, the term of this patent is extended or adjusted under 35 U.S.C. 154(b) by 1570 days.

(21) Appl. No.: 11/396,299

(22) Filed: Mar. 31, 2006

(65) Prior Publication Data

US 2007/0233881 A1  Oct. 4, 2007

(51) Int. Cl.
*G06F 7/04* (2006.01)

(52) U.S. Cl.
USPC ............................................. 726/20; 726/27

(58) Field of Classification Search
USPC .................................... 717/168, 174; 726/20
See application file for complete search history.

(56) References Cited

U.S. PATENT DOCUMENTS

| | | | |
|---|---|---|---|
| 5,740,357 A | 4/1998 | Gardiner et al. |
| 5,768,568 A | 6/1998 | Inui et al. |
| 5,805,820 A | 9/1998 | Bellovin et al. |
| 5,809,012 A | 9/1998 | Takase et al. |
| 5,940,593 A | 8/1999 | House et al. |
| 6,016,499 A | 1/2000 | Ferguson |
| 6,023,702 A | 2/2000 | Liesten et al. |
| 6,065,052 A | 5/2000 | Van |
| 6,138,162 A | 10/2000 | Pistriotto et al. |
| 6,167,438 A | 12/2000 | Yates et al. |
| 6,178,173 B1 | 1/2001 | Mundwiler et al. |
| 6,184,778 B1 | 2/2001 | Tsuji |
| 6,189,038 B1 | 2/2001 | Thompson et al. |
| 6,199,195 B1 | 3/2001 | Goodwin et al. |
| 6,226,788 B1 | 5/2001 | Schoening et al. |

(Continued)

FOREIGN PATENT DOCUMENTS

| | | |
|---|---|---|
| CN | 1620653 A | 5/2005 |
| EP | 0697654 A1 | 2/1996 |

(Continued)

OTHER PUBLICATIONS

Jie Wu et al., "SMART: A Scan-Based Movement-Assisted Sensor Deployment Method in Wireless Sensor Networks", 2005, INFOCOMM 2005, 24$^{th}$ Annual Joint Conference of the IEEE Computer and Communications Societies, Mar. 13-17, 2005, pp. 2313-2324.*

(Continued)

*Primary Examiner* — Jeffrey Pwu
*Assistant Examiner* — Carlos Amorin
(74) *Attorney, Agent, or Firm* — Brake Hughes Bellermann LLP

(57) ABSTRACT

Systems and methods allow service-to-device mapping by which services are mapped onto best-suited smart items selected from a plurality of smart items of a sensor network. As part of the mapping, and/or subsequent thereto, a deployment of the service(s) onto the smart items is initiated. However, in some cases, the deployment may fail, or may only partially succeed. In such cases, one or more conditions of the deployment may be altered to obtain a modified, allowable deployment condition, so that the deployment may then proceed. As a result, users may achieve a desired result in a fast, convenient, and reliable manner, even when executing the deployment remotely or automatically.

19 Claims, 5 Drawing Sheets

(56) References Cited

U.S. PATENT DOCUMENTS

| | | | | |
|---|---|---|---|---|
| 6,256,739 | B1 | 7/2001 | Skopp et al. | |
| 6,262,726 | B1 | 7/2001 | Stedman et al. | |
| 6,292,856 | B1 | 9/2001 | Marcotte | |
| 6,308,178 | B1 | 10/2001 | Chang et al. | |
| 6,343,287 | B1 | 1/2002 | Kumar et al. | |
| 6,363,411 | B1 | 3/2002 | Dugan et al. | |
| 6,378,128 | B1 * | 4/2002 | Edelstein et al. | 717/174 |
| 6,442,748 | B1 | 8/2002 | Bowman-Amuah | |
| 6,460,082 | B1 | 10/2002 | Lumelsky et al. | |
| 6,480,977 | B1 | 11/2002 | Apisdorf et al. | |
| 6,606,740 | B1 | 8/2003 | Lynn et al. | |
| 6,643,669 | B1 | 11/2003 | Novak et al. | |
| 6,654,953 | B1 | 11/2003 | Beaumont et al. | |
| 6,686,838 | B1 | 2/2004 | Rezvani et al. | |
| 6,687,846 | B1 | 2/2004 | Adrangi et al. | |
| 6,694,335 | B1 | 2/2004 | Hopmann et al. | |
| 6,757,720 | B1 | 6/2004 | Weschler, Jr. | |
| 6,769,000 | B1 | 7/2004 | Akhtar | |
| 6,785,707 | B2 | 8/2004 | Teeple | |
| 6,816,862 | B2 | 11/2004 | Mulgund et al. | |
| 6,832,373 | B2 | 12/2004 | O'Neill | |
| 6,842,903 | B1 | 1/2005 | Weschler | |
| 6,847,974 | B2 | 1/2005 | Wachtel | |
| 6,859,831 | B1 | 2/2005 | Gelvin et al. | |
| 6,891,823 | B1 | 5/2005 | Schwartz et al. | |
| 6,892,236 | B1 | 5/2005 | Conrad et al. | |
| 6,927,686 | B2 | 8/2005 | Nieters et al. | |
| 6,961,763 | B1 | 11/2005 | Wang et al. | |
| 6,970,902 | B1 | 11/2005 | Moon | |
| 6,977,938 | B2 | 12/2005 | Alriksson | |
| 6,980,993 | B2 | 12/2005 | Horvitz et al. | |
| 6,986,148 | B2 | 1/2006 | Johnson, Jr. et al. | |
| 6,990,660 | B2 | 1/2006 | Moshir et al. | |
| 7,003,663 | B2 | 2/2006 | Lagosanto et al. | |
| 7,024,430 | B1 | 4/2006 | Ingraham et al. | |
| 7,043,419 | B2 | 5/2006 | Chess et al. | |
| 7,072,960 | B2 | 7/2006 | Graupner et al. | |
| 7,075,960 | B2 | 7/2006 | Kohara et al. | |
| 7,096,461 | B1 | 8/2006 | Nakamura et al. | |
| 7,099,582 | B2 | 8/2006 | Belhadj-Yahya et al. | |
| 7,099,946 | B2 | 8/2006 | Lennon et al. | |
| 7,114,146 | B2 | 9/2006 | Zhang et al. | |
| 7,116,674 | B2 | 10/2006 | Shi | |
| 7,130,773 | B1 | 10/2006 | Wong | |
| 7,152,019 | B2 | 12/2006 | Tarantola | |
| 7,171,471 | B1 | 1/2007 | Nair | |
| 7,206,289 | B2 | 4/2007 | Hamada | |
| 7,209,739 | B1 | 4/2007 | Narayanabhatla | |
| 7,219,254 | B2 | 5/2007 | Rathunde et al. | |
| 7,227,889 | B1 | 6/2007 | Roeck et al. | |
| 7,237,243 | B2 | 6/2007 | Sutton et al. | |
| 7,286,158 | B1 | 10/2007 | Griebenow | |
| 7,292,963 | B2 | 11/2007 | Bornhoevd et al. | |
| 7,302,401 | B1 | 11/2007 | Tervonen | |
| 7,304,976 | B2 | 12/2007 | Mao et al. | |
| 7,312,703 | B2 | 12/2007 | Hoogenboom | |
| 7,313,467 | B2 | 12/2007 | Breed et al. | |
| 7,319,976 | B1 | 1/2008 | Peckover | |
| 7,362,731 | B2 | 4/2008 | Vinayakray | |
| 7,382,741 | B2 | 6/2008 | Rao | |
| 7,413,513 | B2 | 8/2008 | Nguyen et al. | |
| 7,506,338 | B2 | 3/2009 | Alpern et al. | |
| 7,554,920 | B2 | 6/2009 | Alam et al. | |
| 7,557,707 | B2 | 7/2009 | Kumar et al. | |
| 7,584,471 | B2 | 9/2009 | Bjare et al. | |
| 7,616,642 | B2 | 11/2009 | Anke et al. | |
| 7,673,799 | B2 * | 3/2010 | Hart et al. | 235/449 |
| 7,752,068 | B1 | 7/2010 | Micklavzina et al. | |
| 7,756,969 | B1 | 7/2010 | Clarke et al. | |
| 7,853,946 | B2 | 12/2010 | Minagawa | |
| 7,860,968 | B2 | 12/2010 | Bornhoevd et al. | |
| 7,890,568 | B2 | 2/2011 | Belenki | |
| 7,930,143 | B2 | 4/2011 | Tarantola et al. | |
| 8,001,527 | B1 * | 8/2011 | Qureshi et al. | 717/120 |
| 8,005,879 | B2 | 8/2011 | Bornhoevd et al. | |
| 8,065,411 | B2 | 11/2011 | Spiess et al. | |
| 8,131,838 | B2 | 3/2012 | Bornhoevd et al. | |
| 8,156,208 | B2 | 4/2012 | Bornhoevd et al. | |
| 8,166,524 | B2 * | 4/2012 | Sentinelli | 726/5 |
| 8,201,191 | B2 * | 6/2012 | Ladd et al. | 719/328 |
| 8,296,408 | B2 | 10/2012 | Anke et al. | |
| 8,296,413 | B2 | 10/2012 | Bornhoevd et al. | |
| 8,396,788 | B2 | 3/2013 | Anke | |
| 2001/0051981 | A1 | 12/2001 | Davison | |
| 2002/0007422 | A1 | 1/2002 | Bennett | |
| 2002/0100036 | A1 | 7/2002 | Moshir et al. | |
| 2002/0131386 | A1 | 9/2002 | Gwon | |
| 2002/0161751 | A1 | 10/2002 | Mulgund et al. | |
| 2002/0174169 | A1 | 11/2002 | Schmid | |
| 2002/0184103 | A1 | 12/2002 | Shah et al. | |
| 2002/0184348 | A1 | 12/2002 | Rapp et al. | |
| 2002/0188866 | A1 | 12/2002 | Ca et al. | |
| 2002/0199173 | A1 | 12/2002 | Bowen | |
| 2003/0005350 | A1 | 1/2003 | Koning et al. | |
| 2003/0016664 | A1 | 1/2003 | MeLampy et al. | |
| 2003/0018810 | A1 | 1/2003 | Karagiannis | |
| 2003/0033351 | A1 | 2/2003 | Ricciardi | |
| 2003/0050902 | A1 | 3/2003 | Buczak et al. | |
| 2003/0078946 | A1 | 4/2003 | Costello et al. | |
| 2003/0097443 | A1 | 5/2003 | Gillett et al. | |
| 2003/0144001 | A1 | 7/2003 | Nakatsugawa | |
| 2003/0217186 | A1 | 11/2003 | Bushey | |
| 2003/0228910 | A1 | 12/2003 | Jawaharlal et al. | |
| 2004/0024768 | A1 | 2/2004 | Haller | |
| 2004/0059810 | A1 | 3/2004 | Chess | |
| 2004/0088231 | A1 | 5/2004 | Davis | |
| 2004/0111499 | A1 | 6/2004 | Dobrowski et al. | |
| 2004/0121792 | A1 | 6/2004 | Allen et al. | |
| 2004/0146064 | A1 | 7/2004 | Kramer | |
| 2004/0166807 | A1 | 8/2004 | Vesikivi et al. | |
| 2004/0181541 | A1 | 9/2004 | Groenendaal et al. | |
| 2004/0193703 | A1 | 9/2004 | Loewy et al. | |
| 2004/0220910 | A1 | 11/2004 | Zang et al. | |
| 2004/0243352 | A1 | 12/2004 | Morozumi et al. | |
| 2004/0249944 | A1 | 12/2004 | Hosking et al. | |
| 2004/0250113 | A1 | 12/2004 | Beck | |
| 2005/0060365 | A1 | 3/2005 | Robinson et al. | |
| 2005/0071443 | A1 | 3/2005 | Menon et al. | |
| 2005/0080892 | A1 | 4/2005 | Moser et al. | |
| 2005/0114431 | A1 | 5/2005 | Singh et al. | |
| 2005/0119001 | A1 | 6/2005 | Watanabe | |
| 2005/0120342 | A1 | 6/2005 | Saracco et al. | |
| 2005/0183061 | A1 | 8/2005 | Papanikolaou et al. | |
| 2005/0198228 | A1 | 9/2005 | Bajwa et al. | |
| 2005/0228763 | A1 | 10/2005 | Lewis et al. | |
| 2005/0235058 | A1 | 10/2005 | Rackus et al. | |
| 2005/0235136 | A1 | 10/2005 | Barsotti et al. | |
| 2005/0249121 | A1 | 11/2005 | Takahashi | |
| 2005/0251783 | A1 * | 11/2005 | Torone et al. | 717/104 |
| 2006/0022801 | A1 | 2/2006 | Husak et al. | |
| 2006/0026591 | A1 | 2/2006 | Backhouse et al. | |
| 2006/0029054 | A1 | 2/2006 | Breh et al. | |
| 2006/0047545 | A1 | 3/2006 | Kumar et al. | |
| 2006/0052882 | A1 | 3/2006 | Kubach et al. | |
| 2006/0074912 | A1 | 4/2006 | Borthakur et al. | |
| 2006/0085798 | A1 | 4/2006 | Bendiksen et al. | |
| 2006/0101453 | A1 * | 5/2006 | Burkhart et al. | 717/168 |
| 2006/0106581 | A1 | 5/2006 | Bornhoevd et al. | |
| 2006/0107284 | A1 | 5/2006 | Crawford et al. | |
| 2006/0129367 | A1 | 6/2006 | Mishra et al. | |
| 2006/0143181 | A1 | 6/2006 | Liu et al. | |
| 2006/0143592 | A1 | 6/2006 | Bender et al. | |
| 2006/0146991 | A1 | 7/2006 | Thompson et al. | |
| 2006/0161909 | A1 * | 7/2006 | Pandey et al. | 717/168 |
| 2006/0173726 | A1 | 8/2006 | Hall et al. | |
| 2006/0206582 | A1 | 9/2006 | Finn | |
| 2006/0212453 | A1 | 9/2006 | Eshel et al. | |
| 2006/0212698 | A1 | 9/2006 | Peckover | |
| 2006/0215601 | A1 | 9/2006 | Vleugels et al. | |
| 2006/0215692 | A1 | 9/2006 | Yang | |
| 2006/0218244 | A1 | 9/2006 | Rasmussen et al. | |
| 2006/0225064 | A1 | 10/2006 | Lee et al. | |
| 2006/0235976 | A1 | 10/2006 | Chen et al. | |
| 2006/0265661 | A1 | 11/2006 | Ball | |

| | | | |
|---|---|---|---|
| 2006/0277079 | A1 | 12/2006 | Gilligan et al. |
| 2006/0277539 | A1* | 12/2006 | Amarasinghe et al. ........ 717/168 |
| 2007/0006122 | A1* | 1/2007 | Bailey et al. .................. 717/101 |
| 2007/0011334 | A1 | 1/2007 | Higgins et al. |
| 2007/0032244 | A1 | 2/2007 | Counts et al. |
| 2007/0043945 | A1* | 2/2007 | Choi et al. .................... 713/168 |
| 2007/0112574 | A1 | 5/2007 | Greene |
| 2007/0118496 | A1 | 5/2007 | Bornhoevd et al. |
| 2007/0118549 | A1 | 5/2007 | Bornhoevd et al. |
| 2007/0118560 | A1 | 5/2007 | Bornhoevd et al. |
| 2007/0123256 | A1 | 5/2007 | Whitesell et al. |
| 2007/0130208 | A1 | 6/2007 | Bornhoevd et al. |
| 2007/0130217 | A1 | 6/2007 | Linyard et al. |
| 2007/0168690 | A1 | 7/2007 | Ross |
| 2007/0168919 | A1 | 7/2007 | Henseler et al. |
| 2007/0168925 | A1 | 7/2007 | Bornhoevd et al. |
| 2007/0192464 | A1 | 8/2007 | Tullberg et al. |
| 2007/0204261 | A1 | 8/2007 | Fetzer et al. |
| 2007/0249286 | A1 | 10/2007 | Ma et al. |
| 2007/0251998 | A1 | 11/2007 | Belenki |
| 2007/0276619 | A1 | 11/2007 | Sugahara et al. |
| 2007/0276674 | A1 | 11/2007 | Hemmat |
| 2007/0282746 | A1 | 12/2007 | Anke et al. |
| 2007/0282988 | A1 | 12/2007 | Bornhoevd et al. |
| 2007/0283001 | A1 | 12/2007 | Spiess et al. |
| 2007/0283002 | A1 | 12/2007 | Bornhoevd et al. |
| 2007/0294362 | A1* | 12/2007 | Patel ............................. 709/217 |
| 2008/0010284 | A1 | 1/2008 | Beck |
| 2008/0033785 | A1 | 2/2008 | Anke |
| 2008/0052314 | A1 | 2/2008 | Batabyal |
| 2008/0270486 | A1 | 10/2008 | Hind et al. |
| 2008/0306798 | A1 | 12/2008 | Anke et al. |
| 2008/0307515 | A1* | 12/2008 | Drokov et al. .................... 726/7 |
| 2009/0067628 | A1* | 3/2009 | Pudney et al. ................ 380/247 |
| 2009/0097397 | A1 | 4/2009 | Moreira Sa de Souza |
| 2010/0122236 | A1 | 5/2010 | Bugir et al. |
| 2010/0275010 | A1* | 10/2010 | Ghirardi ....................... 713/155 |
| 2011/0185433 | A1* | 7/2011 | Amarasinghe et al. ......... 726/25 |
| 2011/0225417 | A1* | 9/2011 | Maharajh et al. ............. 713/150 |
| 2011/0314524 | A9* | 12/2011 | Chiruvolu .......................... 726/5 |
| 2012/0166638 | A1 | 6/2012 | Bornhoevd et al. |
| 2012/0311321 | A1* | 12/2012 | Landrock et al. ............. 713/155 |

FOREIGN PATENT DOCUMENTS

| | | |
|---|---|---|
| EP | 0810755 A3 | 3/1999 |
| EP | 1372073 A2 | 12/2003 |
| EP | 1788480 A2 | 5/2007 |
| EP | 1863223 A1 | 12/2007 |
| EP | 1892656 A1 | 2/2008 |
| JP | 2002500785 A | 1/2002 |
| JP | 2003067351 A | 3/2003 |
| JP | 2004110318 A2 | 4/2004 |
| WO | 2005/106666 A1 | 11/2005 |

OTHER PUBLICATIONS

Didier Hoareau et al., "Constraint-Based Deployment of Distributed Components in a Dynamic Network", 2006, ARCS 2006, LNCS 3894, W. Grass et al. (Eds.), pp. 450-464.*
Final Office Action for U.S. Appl. No. 11/583,274, mailed Apr. 7, 2010, 45 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.
Speiss, et al, "going beyond auto-id—a service-oriented smart items infrastructure", JEIM, Mar. 2007, 9 pages.
Strohbach, et al, "Cooperative Artefacts:Assessing Real World Situations with Embedded Technology", In Proceedings of the 6th International Conference on Ubiquitous Computing, Nottingham, UK, 2004, pp. 250-267.
Sun Microsystems, "Connected Limited Device Configuration", Java™ 2 Platform, Micro Edition (J2ME™) Specification Version 1.1, Mar. 2003, 60 pages.

Sun Microsystems, "Jini Architecture Specification", Version 1.2, Dec. 2001, 26 pages.
Sun Microsystems, "Sun SPOT System: Turning Vision into Reality", Sun SPOT System Project description, 2005, 4 pages.
Talwar, et al, "Approaches for Service Deployment", IEEE Internet Computing, vol. 9(2), Mar.-Apr. 2005, pp. 70-80.
"Universal Plug and Play (UPnP)", Wikepedia, the free encyclopedia, Retrieved on Dec. 20, 2005, from http://en.wikipedia.org/wiki/Universal_Plug_and_Play, 6 pages.
"UPnP Device Architecture 1.0", UPnP Forum, 1999, 80 pages.
van de Loo, et al, "Enterprise Services Design Guide", Version 1.0, SAP, 2005, pp. 1-40.
van der Aalst, "Modelling and analysing workflow using a Petri-net based approach", Proceedings of the 2nd Workshop on Computer-Supported Cooperative Work, Petri nets and related formalisms, 1994, pp. 31-50.
Veizades, et al, "Service Location Protocol. Request for Comments RFC 2165", Network Working Group, Jun. 1997, 72 pages.
VeriSign, "The EPCglobal Network: Enhancing the Supply Chain", VeriSign Technical Report, 2004, 8 pages.
Villanueva, et al, "Context-Aware QoS Provision for Mobile Ad-hoc Network-based Ambient Intelligent Environments", Header Background Image, 12(3), 2006, 13 pages.
Waldo, "The Jini architecture for network-centric computing", Communications of the ACM archive, vol. 42 , Issue 7, Jul. 1999, pp. 76-82.
Wander et al, "Energy Analysis of Public-Key Cryptography for Wireless Sensor Networks", UC Santa Cruz, Sun Microsystems Laboratories, 2005, 5 pages.
Wang, et al, "Timing Analysis of Real-Time Networked RFID Systems", Cambridge Auto-ID Lab, Cambridge UK, 2004, 4 pages.
Warneke, et al, "Smart dust: Communicating with a cubic-millimeter computer", Computer, 34(1), 2001, pp. 44-51.
Weiser, "The computer for the 21st century", ACM SIGMOBILE Mobile Computing and Communications Review archive, vol. 3 , Issue 3, Jul. 1999, 6 pages.
"Java Native Interface (JNI)", Wikepedia, the free encyclopedia, Retrieved on Dec. 20, 2005, from http://en.wikipedia.org/wiki/Jini, 6 pages.
"Service Location Protocol (SLP)", Wikepedia, the free encyclopedia, Retrieved on Dec. 20, 2005, from http://en.wikipedia.org/wiki/Service_Location_Protocol, 1 page.
Woods, "Enterprise Services Architecture", Galileo Press, 2003, 10 pages.
Koh, et al, "Securing the Pharmaceutical Supply", White Paper, 2003, 19 pages.
Office Action for Chinese Application No. 200710108723.3 (with English Translation), mailed May 21, 2010, 11 pages.
Office Action for Chinese Application No. 200710108722.9 (with English Translation), mailed Jun. 2, 2010, 9 pages.
Non-Final Office Action for U.S. Appl. No. 11/479,284, mailed Oct. 30, 2009, 19 pages.
Final Office Action for U.S. Appl. No. 11/479,284, mailed Jun. 11, 2009, 4 pages.
Notice of Allowance for U.S. Appl. No. 11/479,284, mailed on Oct. 13, 2010, 19 pages.
Notice of Allowance for U.S. Appl. No. 11/479,284, mailed Aug. 11, 2010, 19 pages.
Non-Final Office Action for U.S. Appl. No. 11/583,274, mailed Aug. 5, 2010, 21 pages.
Notice of Allowance for U.S. Appl. No. 11/413,230, mailed Oct. 13, 2010, 10 pages.
Non-Final Office Action for U.S. Appl. No. 11/413,230, mailed Oct. 16, 2009, 11 pages.
Final Office Action for U.S. Appl. No. 11/433,621, mailed Dec. 23, 2010, 28 pages.
Non-Final Office Action for U.S. Appl. No. 11/433,621, mailed Aug. 17, 2010, 24 pages.
Final Office Action for U.S. Appl. No. 11/443,549, mailed Mar. 17, 2010, 32 pages.
Final Office Action for U.S. Appl. No. 11/444,279, mailed Sep. 10, 2010, 21 pages.

Non-Final Office Action for U.S. Appl. No. 11/444,279, mailed Sep. 28, 2009, 22 pages.
Non-Final Office Action for U.S. Appl. No. 11/444,279, mailed Mar. 22, 2010, 20 pages.
Non-Final Office Action for U.S. Appl. No. 11/496,641, mailed Jul. 29, 2010, 35 pages.
Final Office Action for U.S. Appl. No. 11/283,618, mailed Oct. 5, 2010, 27 pages.
Advisory Action for U.S. Appl. No. 11/284,195, mailed Oct. 9, 2008, 4 pages.
Final Office Action for U.S. Appl. No. 11/284,195, mailed Jun. 25, 2008, 24 pages.
Non-Final Office Action for U.S. Appl. No. 11/284,195, mailed Nov. 1, 2007, 20 pages.
Non-Final Office Action for U.S. Appl. No. 11/443,549, mailed Jan. 6, 2011, 28 pages.
Final Office Action for U.S. Appl. No. 11/444,119, mailed Aug. 24, 2010, 23 pages.
US 7,801,983, 09/2010, Bornhoevd et al. (withdrawn).
Ardaiz, et al, "On Service Deployment in Ubiquitous Computing", Proceedings of the 2nd International Workshop on Ubiquitous Computing and Communications, Sep. 2001, 7 pages.
Arkin, et al, "Web Services Business Process Execution Language Version 2.0", Committee Draft, Sep. 2005, 81 pages.
Arkin, et al, "Web Service Choreography Interface (WSCI) Version 1.0", W3C Note, Aug. 2002, 84 pages.
Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.
Box, et al, "Web Services Eventing (WS-Eventing)", Aug. 2004, 16 pages.
Crossbow, "Wireless Sensor Networks: Sensor and Data-Acquisition Boards", 2004 Crossbow Technology, Inc., retrieved on Sep. 13, 2010 from http://web.archive.org/web/20040111135950/http://www.xbow.com/Products/productsdetails.aspx?sid=63, 1 page.
Crossbow, "Stargate: X-Scale Processor Platform SPB 400", retrieved on Dec. 20, 2005 from http://www.xbow.com/Products/productsdetails.aspx?sid=63, 2 pages.
Clement, et al, "UDDI version 3.2, UDDI Spec Technical Committee Draft, OASIS, UDDI Spec TC", Oct. 2004, 420 pages.
Christensen, et al, "Web Services Description Language (WSDL) 1.1", W3C Note, Mar. 2001, 27 pages.
Perkins, "IP Mobility Support for IPv4", Network Working Group, Nokia Research Center, Aug. 2002, 23 pages.
California Software Laboratories, "White Paper: The JetSend Appliance Architecture", retrieved from http://www.calsoftlabs.com/whitepapers/jetsend-architecture.html, 2002, 28 pages.
Davenport, "Process Innovation: Reengineering work through information technology", Harvard Business School Press, 1993, 6 pages.
de Sales, et al, "Towards the UPnP-UP: Enabling User Profile to Support Customized Services in UPnP Networks", Proceedings of the 2008 The Second International Conference on Mobile Ubiquitous Computing, Systems, Services and Technologies, 2008, pp. 206-211.
Decker, et al, "CoBIs Platform Survey and State-of-the-Art Sensor Platforms", CoBIs Deliverable Report, Aug. 2005, 51 pages.
Deering, et al, "Internet Protocol, Version 6 (Ipv6) Specification", Network Working Group, Dec. 1998, 39 pages.
Gauger, "FlexCup—Flexible and Efficient Code Updates for Sensor Networks", Summer School on Wireless Sensor Networks and Smart Objects; Universitat Stuttgart, Aug. 29-Sep. 3, 2005, 8 pages.
Geller, et al, "Web Services Eventing (WS-Eventing)", Aug. 2004, 38 pages.
Gudgin, et al, "SOAP Message Transmission Optimization Mechanism", Jan. 25, 2005, 15 pages.
Guttman, "Service Location Protocol", Version 2, Jun. 1999, 55 pages.
Haas, "Service Deployment in Programmable Networks", PhD Thesis, ETH Zurich, Switzerland, 2003, 253 pages.
Hammer, et al, "Reengineering the Corporation—A Manifesto for Business Revolution", Nicholas Brealey Publishing, May 1994, 14 pages.
Han, et al, "Sensor Network Software Update Management: A Survey", Journal of Network Management, 2005, 26 pages.
Intel Research, "An Introduction to Wireless Sensor Networks", Technical Report, 2004, 6 pages.
Karuppiah, et al, "Design and Implementation of Multihomed IPv6 Testbed Network for Research Community: The Malaysian IPv6 Network Operation Centre Experience", IWS2000, APAN Conference, Tsukuba, 2000, 6 pages.
Kim, et al, "A leader election algorithm in a distributed computing system", 5th IEEE Workshop on Future Trends of Distributed Computing Systems, 1995, 5 pages.
Kiselyov, "Functional XML parsing framework: SAX/DOM and SXML parsers with support for XML Namespaces and validation", 2001, 42 pages.
Lampe, et al, "A ubiquitous computing environment for aircraft maintenance", SAC '04: Proceedings of the 2004 ACM Symposium on Applied Computing, 2004, pp. 1586-1592.
Law, et al, "Assessing Security-Critical Energy-Efficient Sensor Networks", 2002, 10 pages.
Malpani, et al, "Leader election algorithms for mobile ad hoc networks", Proceedings of the 4th international Workshop on Discrete Algorithms and Methods for Mobile Computing and Communications, Aug. 11, 2000, pp. 96-103.
Nochta, et al, "Relocatable services and service classification scheme", Authorization Level: Public (PU) Version 1.0, Feb. 2005, 59 pages.
Nokia, "Nokia Intellisync Device Management", Overview for IT Managers, May 2007, 19 pages.
"OSGI Service Platform", Release 3, IOS Press, Mar. 2003, 602 pages.
Parikh, et al, "Security in Sensor Networks", CS 588: Cryptography, 2001, 28 pages.
Park, "Specification of the Bluetooth System: Wireless connections made easy", Covered Core Package version: 1.2, Nov. 2003, 1200 pages.
Passing, "Profiling, Monitoring and Tracing in SAP WebAS", SAP Library, Jun. 22, 2005, 9 pages.
Phillips, "Aqueduct: Robust and Efficient Code Propagation in Heterogeneous Wireless Sensor Networks", Master's Thesis submitted to the Graduate School of the University of Colorado, 2005, 61 pages.
Postel, "Internet Control Message Protocol", Protocol Specification. Request for Comments RFC 792, Sep. 1981, 21 pages.
Postel, "Internet Protocol", Protocol Specification, Request for Comments RFC 791, Sep. 1981, 51 pages.
Postel, "Transmission Control Protocol", Protocol Specification, Request for Comments RFC 793, Sep. 1981, 91 pages.
Postel, "User Datagram Protocol", Protocol Specification, Request for Comment, RFC 768, Information Sciences Institute, Aug. 1980, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Adaptive Technology for the Networked Enterprise", Feb. 2005, retrieved on Sep. 9, 2010 from http://web.archive.org/web/*/http://www.sap.com/solutions/netweaver/index.epx, 1 page.
SAP, "Security Guide for Mobile Engine 2.1 SP02", SAP Library—SAP Mobile Engine, Dec. 1, 2004, 13 pages.
SAX, "About SAX", Dec. 29, 2004, retrieved on Sep. 9, 2010 from http://web.archive.org/web/20041229165357/http://www.saxproject.org/, 1 page.
Scheer, "Aris-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld des Pervasive Computing, 2004, 29 pages.

Schneier, "Applied Cryptography", 2nd edition, John Wiley & Sons, Inc., 1996, 18 pages.
Non-Final Office Action Response for U.S. Appl. No. 11/283,618, filed Feb. 17, 2012, 12 pages.
Non-Final Office Action Response for U.S. Appl. No. 11/283,618, filed Aug. 24, 2011, 13 pages.
Final Office Action for U.S. Appl. No. 11/283,618, mailed Sep. 29, 2011, 32 pages.
Notice of Allowance for U.S. Appl. No. 11/284,195, mailed Jun. 27, 2011, 17 pages.
Notice of Allowance for U.S. Appl. No. 11/284,195, mailed Mar. 4, 2011, 45 pages.
Non-Final Office Action for U.S. Appl. No. 11/433,621, mailed Mar. 6, 2012, 18 pages.
Final Office Action Response for U.S. Appl. No. 11/443,549, filed Nov. 1, 2011, 10 pages.
Final Office Action for U.S. Appl. No. 11/443,549, mailed Jun. 22, 2011, 52 pages.
Notice of Allowance for U.S. Appl. No. 11/444,119, mailed Oct. 5, 2011, 17 pages.
Notice of Allowance for U.S. Appl. No. 11/444,119, mailed Apr. 1, 2011, 26 pages.
Notice of Allowance for U.S. Appl. No. 11/444,279, mailed Oct. 27, 2011, 13 pages.
Non-Final Office Action Response for U.S. Appl. No. 11/444,279, filed Oct. 7, 2011, 8 pages.
Final Office Action Response for U.S. Appl. No. 11/496,641, filed Mar. 19, 2012, 13 pages.
Final Office Action for U.S. Appl. No. 11/496,641, mailed Oct. 19, 2011, 19 pages.
Non-Final Office Action Response for U.S. Appl. No. 11/496,641, filed Sep. 7, 2011, 13 pages.
Notice of Allowance for U.S. Appl. No. 11/583,274, mailed Dec. 28, 2011, 23 pages.
Notice of Allowance for U.S. Appl. No. 11/583,274, mailed Apr. 4, 2011, 28 pages.
Final Office Action for U.S. Appl. No. 11/810,357, mailed Feb. 17, 2011, 15 pages.
Office Action for U.S. Appl. No. 11/810,357, mailed on Feb. 17, 2011, 38 pages.
Office Action Response for U.S. Appl. No. 11/433,621, filed Mar. 23, 2011, 14 pages.
Office Action for U.S. Appl. No. 11/283,618, mailed on Mar. 31, 2011, 33 pages.
Notice of Allowance for U.S. Appl. No. 11/284,195, mailed on Mar. 4, 2011, 46 pages.
Notice of Allowance for U.S. Appl. No. 11/444,119, mailed on Apr. 1, 2011, 50 pages.
Notice of Allowance for U.S. Appl. No. 11/583,274, mailed on Apr. 4, 2011, 28 pages.
Office Action for U.S. Appl. No. 11/444,279, mailed on Apr. 28, 2011, 36 pages.
Office Action Response for U.S. Appl. No. 11/810,357, filed Apr. 14, 2011, 18 pages.
Office Action for U.S. Appl. No. 11/496,641, mailed on Jun. 7, 2011, 37 pages.
US 7,752,304, 07/2010, Bornhoevd et al. (withdrawn).
Office Action for Japanese Patent Application No. 2006-314565 (with English Translation), mailed on Feb. 12, 2010, 9 pages.
Krause, et al., "Near-optimal Sensor Placements: Maximizing Information while Minimizing Communication Cost", Proceedings of the 5th International Conference on Information Processing in Sensor Networks, 2006, pp. 2-9.
Office Action for Chinese Application No. 200610149270.4 (with English Translation), mailed on Mar. 1, 2010, 18 pages.
Office Action for Chinese Application No. 200610149268.7 (with English Translation), mailed on Mar. 1, 2010, 16 pages.
Office Action for U.S. Appl. No. 11/810,357, mailed on Apr. 26, 2010, 44 pages.
Notice of Allowance for U.S. Appl. No. 11/479,284, mailed on May 13, 2010, 30 pages.
Office Action for U.S. Appl. No. 11/283,618, mailed on May 24, 2010, 42 pages.
Office Action for U.S. Appl. No. 11/444,119, mailed on Mar. 30, 2010, 45 pages.
Office Action for U.S. Appl. No. 11/413,230, mailed on Apr. 27, 2010, 24 pages.
Office Action for U.S. Appl. No. 11/871,616, mailed on Mar. 9, 2010, 46 pages.
Golatowski, F et al., "Service-Oriented Software Architecture for Sensor Networks", International Workshop on Mobile Computing (Jun. 17-18, 2003), pp. 1-8.
Decasper, D. et al., "Router Plugins: A Software Architecture for Next Generation Routers", Computer Communication Review (Oct. 1998), pp. 229-240.
Wonohoesodo, R et al., "A Role Based Access Control for Web Services", Proceedings of the 2004 IEEE International Conference on Services Computing (2004), pp. 49-56.
Prabhu, B S., et al., "WinRFID—A Middleware for the Enablement of Radio Frequency Identification (RFID) Based Applications", Mobile, Wireless and Sensor Networks (Mar. 28, 2006), pp. 1-23.
Information Society Technologies, "State of the Ari in Resource Management on Wired and Wireless Access Networks with Resilience", Jul. 23, 2004, pp. 1-198.
Carvalho, H et al., "A General Data Fusion Architecture", Proceedings of the 6th International Conference on Information Fusion (Jul. 2003), pp. 1-8.
Hawick, K A., et al., "Middleware for Wireless Sensors and Robots", DHPC Technical Report DHPC-112 (Aug. 18, 2002), pp. 1-6.
European Search Report for Application No. EP07005127.1, mailed Jul. 20, 2007, pp. 1-3.
European Search Report for Application No. EP07008409.0, mailed Aug. 24, 2007, pp. 1-4.
European Search Report for Application No. EP07009428.9, mailed Oct. 4, 2007, pp. 1-4.
European Search Report for Application No. EP07014724.4, mailed Nov. 27, 2007, pp. 1-4.
European Search Report for Application No. EP06023720.3, mailed Apr. 10, 2007, pp. 1-4.
European Search Report for Application No. EP06023256.8, mailed May 9, 2007, pp. 1-5.
Extended European Search Report for Application No. 08017795.9, mailed Feb. 10, 2009, 11 pgs.
"Composite Capability/Preference Profiles (CC/PP): Structure and Vocabularies 1.0", W3C Recommendation (Jan. 15, 2004), pp. 1-78.
Spiess, Patrik et al., "Going Beyond Auto-ID: A Service-oriented Smart Items Infrastructure", Journal of Enterprise Information Management, vol. 20, Issue 3 (2007), pp. 1-9.
Yao, Yong et al., "Query Processing for Sensor Networks", Proceedings of the 2003 CIDR Conference, Jan. 2003, 12 pages.
Skouteli, Chara et al., "Concept-Based Discovery of Mobile Services", Proceedings of the 6th International Conference on Mobile Data Management, Ayia Napa Cyprus, May 13, 2005, 5 pages.
Gounaris, Anastasios et al., "Adaptive Query Processing: A Survey", Lecture Notes in Computer Science, vol. 2405, Archive of Proceedings of the 19th British National Conference on Databases: Advances in Databases, 2002, pp. 11-25.
Hill, Jason Lester, "System Architecture for Wireless Sensor Networks", Dissertation of Jason L. Hill, University of California, Berkeley (2003), 196 pages.
"FAQ: Fault management—How does Fault Management Work?" GoAhead Software (2000), 9 pgs.
Spiess, P., et al, "Collaborative Business Items", Deliverable 401: Management & Maintenance Requirements, CoBIs Project No. IST-004270, Version 1.0 (Jan. 2005), 21 pgs.
"FIPA Device Ontology Specification", Foundation for Intelligent Physical Agents (Apr. 9, 2001), pp. 1-15.
Levis, Philip et al., "TinyOS: An Operating System for Sensor Networks", Feb. 17, 2004, pp. 1-32.
Chatterjee, Mainak et al., "WCA: A Weighted Clustering Alogrithm for Mobile Ad Hoc Networks", Cluster Computing 5, Klluwer Academic Publishers, 2002, pp. 193-204.
Greenstein, Ben et al., "A Sensor Network Application Construction Kit (SNACK)", SenSys '04, Nov. 3-5, 2004, 12 pages.

"The OSGi Service Platform—Dynamic services for networked devices", Retrieved Nov. 16, 2005 from http://www.osgi.org/osgi_technology/index.asp?section=2, 5 pgs.

"TINYOS: Mission Statement", Retrieved Nov. 16, 2005 from http://www.tinyos.net/special/mission, 2 pgs.

Bandara, Ayomi et al., "An Ontological Framework for Semantic Description of Devices", Nov. 11, 2004, 2 pgs.

Vasudevan, Sudarsihan et al., "Design and Analysis of a Leader Election Algorithm for Mobile Ad Hoc Networks", Proceedings of 12th IEEE ICNP, Oct. 8, 2004, 11 pages.

Liu, Jinshan et al., "QoS-aware Service Location in Mobile Ad-Hoc Networks", Proceedings of the 5th International Conference on Mobile Data Management, Berkeley, CA USA, Jan. 2004, 12 pages.

Liu, Jinshan et al., "Group Management for Mobile Ad Hoc Networks: Design, Implementation and Experiment", Proceedings of the 6th International Conference on Mobile Data Management, Ayia Napa Cyprus, May 13, 2005, 8 pages.

European Search Report for EP Application No. 07010652.1 mailed on Oct. 26, 2007, 3 pgs.

European Search Report for EP Application No. 07010654.7 mailed on Oct. 5, 2007, 4 pgs.

European Search Report for Application No. 07010671.1 mailed on Nov. 16, 2007, 4 pgs.

"MVP Brochure", Bitfone Corporation (2005), www.bitfone.com/usa/uploads/mvp.brochure (Retrieved Sep. 20, 2005), pp. 1-3.

Bellavista, Paolo et al., "The Ubiquitous Provisioning of Internet Services to Portable Devices", Pervasive Computing, Jul. 2002, pp. 81-87.

Domagalski, Ronald et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24 2004, 12 pages.

Spiess, P., et al, "Collaborative Business Items", Deliverable 401: Final Project Report, CoBIs Project No. IST-004270, Version 2.0 (Mar. 2007), pp. 1-42.

Gao, T., et al "Toward QoS Analysis of Adaptive Service-Oriented Architecture", Service-Oriented System Engineering, IEEE International Workshop (Oct. 20, 2005), pp. 1-8.

Benatallah, B., "Facilitating the Rapid Development and Scalable Orchestration of Composite Web Services", 2005 Springer Science + Business Media, Inc., pp. 1-33.

Buchholz, S. et al., "Adaptation-Aware Web Caching: Caching in the Future Pervasive Web", In: KiVS, (2003), pp. 55-66.

Casati, F., et al "Specification and Implementation of Exceptions in Workflow Management Systems", ACM Transactions on Database Systems, vol. 24, No. 3, Sep. 1993, pp. 405-451.

Hasiotis, T., et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.

Hwang, S-Y, et al "Personal Workflows: Modeling and Management", MDM 2003, LNCS 2574, pp. 141-152.

Kotov, V. et al., "Optimization of E-Service Solutions with the Systems of Servers Library", Hewlett Packard, Modeling, Analysis and Simulation of Computer and Telecommunication Systems (Aug. 29, 2000), pp. 575-582.

Sheng, Q. Z., et al "Enabling Personalized Composition and Adaptive Provisioning of Web Services", CAiSE 2004, LNCS 2084, pp. 322-337.

Tolksdorf, R., "Coordination Technology for Workflows on the Web: Workspace", Coordination 2000, LNCS 1906, Springer-Verlag Berlin Heidelberg 2000, pp. 36-50.

Foster, I. et al., "The Open Grid Services Architecture, Version 1.0", Informational Document, Global Frid Forum (Jan. 29, 2005), pp. 1-62.

Baker, M. et al., "Grids and Grid Technologies for wide-area Distributed Computing", Software—Practice & Experience (Sep. 27, 2002), pp. 1437-1466.

Mikic-Rakic, M et al., "Improving availability in large, distributed component-based systems via redeployment", LNCS, vol. 3798 (Nov. 3, 2005), 15 pgs.

Malek, S et al., "A decentralized redeployment algorithm for improving the availability of distributed systems", LNCS, vol. 3798 (Nov. 3, 2005), 13 pgs.

Hoareau, D et al., "Constraint-Based Deployment of Distributed Components in a Dynamic Network", LNCS, vol. 3894 (Mar. 16, 2006), pp. 450-464.

Bitkom, "RFID White Paper Technology, Systems and Applications", An Overview for companies seeking to use RFID technology to connect their IT systems directly to the "real" world, Dec. 2005, 50 pgs.

Mikic-Rakic, M et al., "A tailorable environment for assessing the quality of deployment architectures in highly distributed settings", Second International Working Conference on Component Deployment (2004), pp. 1-15.

Ploennigs, J et al., "A traffic model for networked devices in the building automation", In: Proceedings of the 5th IEEE International Workshop on Factory Communication Systems (WFCS 2004), Vienna, Austria, (2004), pp. 137-145.

Wu, Q et al., "Adaptive component allocation in scudware middleware for ubiquitous computing", LNCS, vol. 3824 (Dec. 6, 2005), pp. 1155-1164.

Wegdam, M et al., "Dynamic reconfiguration and load distribution in component middleware", PhD thesis, University of Twente, Enschede, (2003), pp. 1-257.

Colt, Charles et al., "Oracle ® Collaboration Suite, Deployment Guide10g Release 1 (10.1.1) B14479-02", (Oct. 2005), pp. 1-230.

Malek, S et al., "A style-aware architectural middleware for resource-constrained, distributed systems", IEEE Transactions on Software Engineering, vol. 31, Issue 3 (Mar. 2005), pp. 256-272.

Lacour, S et al., "A Software Architecture for Automatic Deployment of CORBA Components Using Grid Technologies", Networking and Internet Architecture, DECOR04 (Nov. 24, 2004), pp. 187-192.

Kichkaylo, T et al., "Constrained Component Deployment in Wide-Area Networks Using AI Planning Techniques", Proceedings of the 17th International Symposium on Parallel and Distributed Processing 2003), pp. 1-10.

Akehurst, D H., et al., "Design Support for Distributed Systems: DSE4DS", Procedings of the 7th Cabernet Radicals Workshop (Oct. 2002), pp. 1-6.

Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.

Wu, X et al., "Performance modeling from software components", ACM SIGSOFT Software Engineering Notes, vol. 29, Issue 1 (Jan. 2004), pp. 290-301.

Stewart, C et al., "Profile driven Component Placement for Cluster-based Online Services", IEEE Distributed Systems Online, vol. 5, No. 10, (Oct. 2004), p. 1-6.

Perkins, C. et al., "IP Mobility Support for IPv4", IETF Standard, Internet Engineering Task Force (Aug. 2002), pp. 1-100.

Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.

Carzaniga, Antonio et al., "Designing distributed applications with mobile code paradigms", In: Proceedings of the 19th International Conference on Software Engineering, Boston, Massachusetts, (1997), pp. 22-32.

Chandra, Bharat et al., "Resource management for scalable disconnected access to web services", WWW '01: Proceedings of the 10th International Conference on World Wide Web (May 5, 2001), pp. 245-256.

ETSI, "Selection procedures for the choice of radio transmission technologies of the UMTS", Universal Mobile Telecommunications System 30.03 version 3.2.0 (Apr. 1998), pp. 1-84.

Fredriksson, Johan et al., "Calculating Resource Trade-offs when Mapping Component Services to Real-Time Tasks", Fourth Conference on Software Engineering Research and Practice (Oct. 2004), pp. 1-8.

Deering, S. et al., "ICMP Router Discovery Messages", IETF Standard, Internet Engineering Task Force (Sep. 1991), pp. 1-19.

Sgroi, Marco et al., "A Service-Based Universal Application Interface for Ad-hoc Wireless Sensor Networks", Preliminary Draft (Nov. 26, 2003), pp. 1-39.

Srivastava, Utkarsh et al., "Operator Placement for In-Network Stream Query Processing", Proceedings of the 24th ACM SIGMOD-SIGACT-SIGART Symposium on Principles of Database Systems (Dec. 2004), pp. 1-10.

Vigna, Giovanni "Mobile Code Technologies, Paradigms, and Applications", PhD Thesis, Politecnico di Milano, Milano, Italy, (1998), pp. 1-89.

Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.

Overeinder, B. et al., "A Dynamic load balancing system for parallel cluster computing", Future Generations computer Systems, Elsevier Science Publishers, Amsterdam, 12, (1), (May 1996), pp. 101-115.

Foster, I. et al., "Globus: A Metacomputing Infrastructure Toolkit", The International Journal of Supercomputer Application and High performance Computing, MIT Press, US, 11 (2), (Jun. 21, 1997), pp. 115-128.

Ferreira, L. et al., "Introduction to Grid Computing with globus", IBM International Technical Support Organization, 2nd edition (Sep. 2003), pp. 1-58.

Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.

Bornhoevd, C. et al., "Integrating Smart Items with Business Processes an Experience Report", IEEE Proceedings of the 38th Hawaii International Conference on System Sciences (Jan. 3, 2005), pp. 1-8.

Bornhoevd, Christof et al., "Integrating Automatic Data Acquisition with Business Processes Experiences with SAPs Auto-ID Infrastructure", Very Large Data Conference (Sep. 3, 2004), pp. 1-8.

Boudec, Jean-Yves L., et al., "A Theory of Deterministic Queuing Systems for the Internet", Network Calculus, Online Version of the Book Springer Verlag—LNCS 2050, (May 10, 2004), pp. 1-269.

Yoonhee, K. et al., "Wapee: A Fault-Tolerant Semantic Middleware in Ubiquitous Computing Environments", Proceedings of EUC Workshops, 2006, pp. 173-182.

Wiemann, M. et al., "A Service and Device Monitoring Service for Smart Items Infrastructures", Third International Conference on Wireless and Mobile Communications 2007, ICWMC, 6 pages.

Paradis, L. et al., "A survey of Fault Management in Wireless Sensor Networks", Journal of Network and systems management, Kluwer Academic Publishers, NE, vol. 15 No. 2, Mar. 13, 2007, pp. 171-190.

Anke, J. et al., "Cost-based Deployment Planning for Components in Smart Item Environments", IEEE Conference on Emerging Technologies and Factory Automation, Sep. 2006, pp. 1238-1245.

Anke, J. et al., "A Planning Method for Component Placement in Smart Item Environments Using Heuristic Search", Proceedings of the 7th IFIP WG 6.1 International Conference, Distributed Applications and Interoperable Systems, Jun. 2007, pp. 309-322.

Anke, J. et al., "A Service-Oriented Middleware for Integration and Management of Heterogeneous Smart Items Environments", Proceedings of the 4th MiNEMA Workshop, Jul. 2006, pp. 7-11.

* cited by examiner

ACTIVE INTERVENTION IN SERVICE-TO-DEVICE MAPPING FOR SMART ITEMS

TECHNICAL FIELD

This description relates to smart item technologies.

BACKGROUND

Software systems exist that provide various services for enterprises or other organizations. Such software systems may rely on decentralized, manual, and potentially error-prone data collection, while storing collected data in a centralized back-end system where business logic execution also occurs. These and other software systems may be extended through the use of smart item (also referred to as smart device), technologies, in which physical items (e.g., goods, tools, rooms, vehicles, persons, or shelves) are augmented or enhanced by the addition or inclusion of locally-provided or embedded technology.

For example, radio-frequency identification (RFID) systems, embedded systems, sensor motes, and/or sensor networks may be used in the above-described manner to provide business software applications with fast access to real-world data. For example, smart item technologies may be used support the detection, reading, or writing of RFID tags, as well as to support communication with, and control of, wireless sensor networks and embedded systems. In many instances, smart items may include, or may be associated with, devices having local processing power, memory, and/or communication capabilities, and that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart items may include an RFID tag, which may be passive or active, and which may be attached to a physical object, as referenced above, and used to provide product or handling information related to the object. Other examples of smart items may include various sensors, such as, for example, environmental sensors (e.g., a temperature, humidity, or vibration sensor), which, as just referenced, may be capable of communicating to form one or more sensor networks. These and other types of smart items also may include embedded systems, which may refer generally to any system in which a special-purpose processor and/or program is included, and/or in which the system is encapsulated in the device being controlled.

Through automatic real-time object tracking and local, on-site execution of business logic, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

SUMMARY

According to one general aspect, a deployment of a service onto a device of a sensor network is initiated, a plurality of services being deployed on the sensor network. A deployment condition associated with the deployment is determined not to meet an allowable deployment condition for the deployment. The deployment condition is altered to obtain a modified deployment condition, and the service is deployed onto the device, based on the modified deployment condition.

According to another general aspect, a system includes a system monitor operable to monitor a plurality of devices of a sensor network, and operable to determine device metadata associated with at least one of the plurality of devices. The system also includes a service mapper operable to initiate a deployment of a service onto the at least one device, based on the device metadata and on service metadata associated with the service, and operable to alter a deployment condition associated with the deployment to obtain a modified deployment condition, based on a determination that the deployment condition does not meet a allowable deployment condition.

According to another general aspect, a service mapper for a sensor network includes a mapping system that is operable to initiate a deployment of a service onto at least one device of the sensor network, based on a deployment condition, the mapping system being further operable to determine that the deployment condition does not meet a allowable deployment condition. The service mapper also includes one or more of requirement reduction logic, network reconfiguration logic, or component removal logic that is operable to provide the mapping system with criteria for altering the deployment condition to obtain a modified deployment condition that satisfies the allowable deployment condition.

The details of one or more implementations are set forth in the accompanying drawings and the description below. Other features will be apparent from the description and drawings, and from the claims.

DETAILED DESCRIPTION

Figure 1:
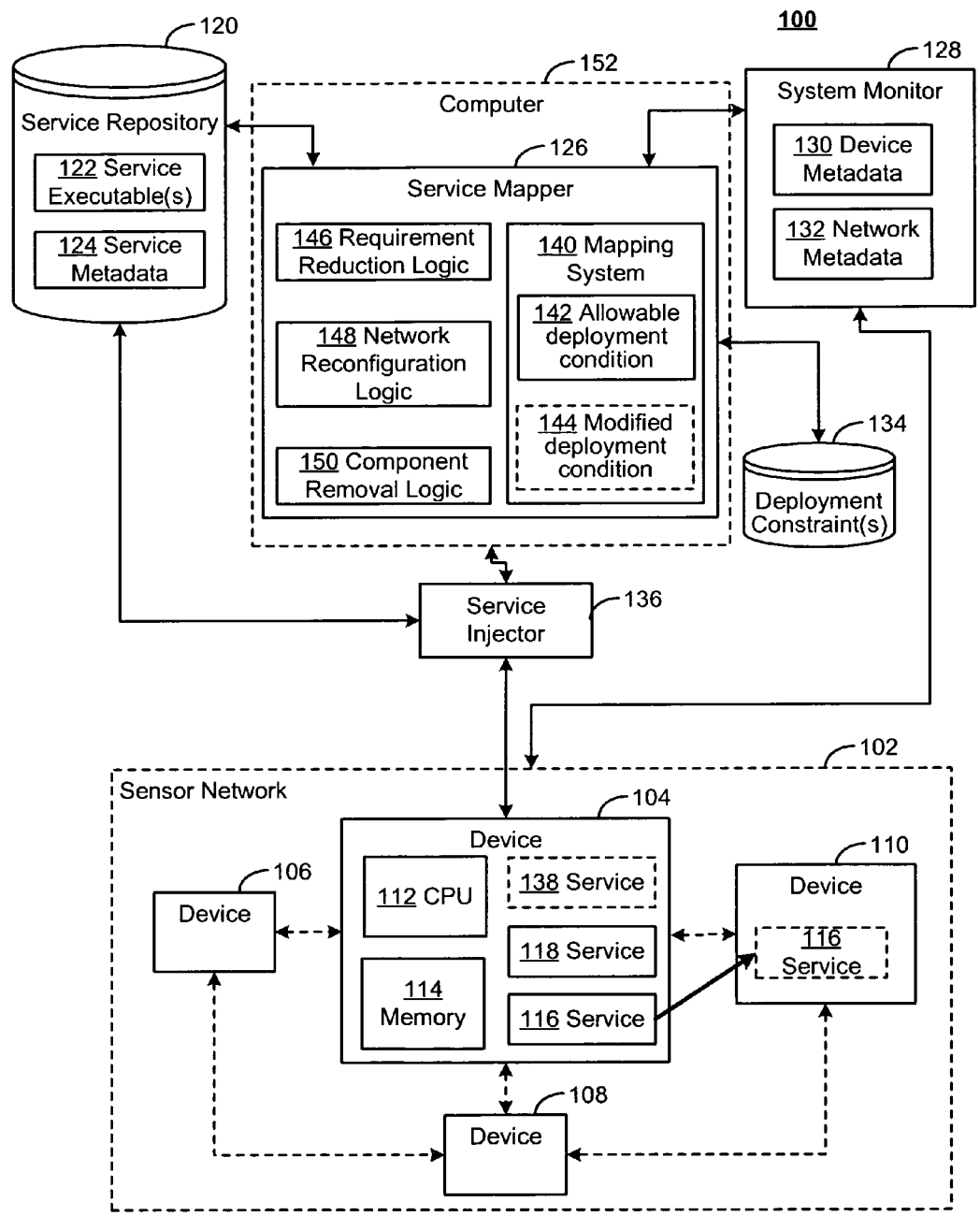
FIG. 1 is a block diagram of a system for active intervention in service-to-device mapping for smart items.

FIG. 1 is a block diagram of a system 100 for active intervention in service-to-device mapping for smart items. As described in more detail below, the system 100 is operable to perform a mapping function by which services are mapped onto best-suited smart items selected from a plurality of smart items of a sensor network 102. As part of the mapping, and/or subsequent thereto, a deployment of the service(s) onto the smart items is initiated. However, in some cases, the deployment may fail, or may only partially succeed. In such cases, the system 100 is operable to alter one or more conditions of the deployment, so that the deployment may then proceed. As a result, operators and users of the system 100 may achieve a desired result in a fast, convenient, and reliable manner, even when executing the deployment remotely or automatically, and may thus be more capable of using the system 100 in a desired fashion.

In the example of FIG. 1, the sensor network 102 includes various smart items or smart devices 104, 106, 108, and 110. That is, it should be understood that the terms "smart items," "smart devices," "smart item devices," and similar terms, may be used similarly or interchangeably in various contexts. For example, the term "smart item" or "smart device" may refer to a device having local processing, storage, and communications capability, as referenced above, or may refer to a combination of such a device and an object to which the device is affixed (e.g., a pallet containing merchandise for sale). As part of the sensor network 102, such devices and/or device/object combinations also may be referred to as "nodes," or "network nodes" in some contexts. In the present description, the term "device" is used for brevity and consistency to refer to the described devices having the described features within the sensor network 102.

Thus, the devices 104, 106, 108, 110, and potentially other devices within the sensor network 102 (and other sensor networks) may provide real-world data to one or more business data processing systems, applications, or processes, in a timely and accurate manner. Examples of such business processes are described in more detail below with respect to FIGS. 3-5, but may include, for example, inventory management systems, supply chain management systems, retail store management systems, warehouse management systems, product life cycle management systems, and any other system(s) that may be used to execute business processes with respect to real-world objects, where such real-world objects may include, for example, products for sale, pallets or other shipment elements, patients, or manufacturing materials/equipment. Thus, the business processes, including those portions of the business processes deployed and executed at the local level of the real-world objects, may be used, for example, to determine inventory levels, set pricing levels, evaluate marketing strategies, evaluate manufacturing or production technologies, reduce theft, or maintain safety.

In FIG. 1, the device 104 is illustrated as including a central processing unit (CPU) 112, as well as a memory 114. Thus, the device 104 should be understood to be capable of various levels of computing capabilities, including, for example, processing or transmitting sensed data (in the case where the device 104 includes, or is associated with, a sensor). Although not specifically illustrated in FIG. 1 for the sake of clarity and brevity, it should be understood that the devices 106, 108, and 110 also may include the same or different computing capabilities, including, for example, the capability to form and participate in the local network 102, such as a wireless network and/or a peer-to-peer network. That is, it should be understood that the devices 104, 106, 108, and 110 may include other standard elements and features, not specifically illustrated in FIG. 1 for the sake of brevity, such as, for example, a (e.g., radio) transceiver and a local power supply/battery.

Thus, the local network 102 may be used to collect, process, filter, aggregate, or transmit data that may be useful to related business processes, and, more specifically, may be used to execute portions of the business processes (e.g., business logic), that are best-suited for (or benefit most highly from) local execution. Specifically, in the example of FIG. 1, the portions of the business processes/business logic deployed on the sensor network include services 116, 118 that are deployed on the device 104.

Various aspects and characteristics of services such as the services 116, 118 are described in more detail, below, e.g., with respect to FIG. 3. In general, though, it should be understood that the services 116, 118, and other services discussed herein, refer generally to software components that support a defined functionality, provide a defined interface through which the service may be invoked, and that may be combined with one another to obtain/provide additional or more complex functionalities. For example, the services 116, 118 may represent enabling services that, e.g., enable collaboration between two or more of the devices 104, 106, 108, 110; or may represent management services that, e.g., manage power consumption of the device 104; or may represent actual business services that, e.g., execute business-specific logic (such as determining a local temperature, and whether the local temperature exceeds a defined value, and whether any action should be taken in response to the local temperature exceeding the defined value).

More specifically, the services 116, 118 may represent instances of services (or service templates) stored in a service repository 120. The service repository 120 may thus provide a convenient location for registering, storing, and accessing services that may be deployed for use within the sensor network 102.

The service repository 120 stores service executables 122 and service metadata 124, where the service executables 122 represent software code that may be instantiated onto the devices 104, 106, 108, 110 for actual execution of associated business logic, while the service metadata 124 represents or includes, for example, various service descriptions and/or requirements that relate to whether and how the service(s) may be executed on one or more devices of the sensor network 102. For example, the service metadata may include a service behavior description, or technical constraints of the service. For example, technical constraints may include a required CPU type or speed, an amount of (free) memory that is needed, a type or speed of connection that is required or preferred, an operating system version/name/description, or a type or status of a battery or other device power source(s). With respect to the service metadata 124, distinctions may be made between static and dynamic service requirements, such as hardware requirements. For example, a static value such as a total memory or maximum processing speed may be included, along with dynamic values such as available memory/processing/power, and/or a number or type of other services that may be allowed to concurrently run on a device together with the service(s) in question, at an execution time of the service(s).

In some examples, the same service may be implemented for a plurality of development platforms, e.g., may be implemented for known development platforms that are based on the C/C++ programming language or the Java programming language. By providing such a diversity of development platforms, a given service may be deployable to a wider range or type of devices that may be in use. Information about the development platform(s) of the service in question may be included as a type of the service metadata 124. Additionally, service interface information describing how the associated service may be called/invoked may be included in, or associated with, the service metadata 124.

The system 100 includes a service mapper 126 that is operable to select at least the device 104 as a selected device from among the plurality of devices 104, 106, 108, 110 of the sensor network 102, for deploying the services 116, 118 thereon, as shown. For example, the service mapper 126 may operate in response to a request from an administrator, or may act automatically in response to a command from an associated business process. Thereafter, the service mapper 126 may access the service repository 120, and may determine appropriate information (i.e., information appropriate to the request or command) from the service metadata 124 and the service executable(s) 122.

In determining whether and how to map services from the service repository 120 onto one or more of the devices 104, 106, 108, 110 of the sensor network 102, the service mapper 126 may be in communication with a system monitor 128. The system monitor 128 may be operable to detect or otherwise determine information related to the devices 104, 106, 108, 110, related to the sensor network 102 as a whole (e.g., to interactions between the devices 104, 106, 108, 110), or related to an environment or use of the devices 104, 106, 108, 110. The system monitor 128 may thus provide, for example, hardware health diagnosis, or may provide statistical data for system software (e.g., names and runtime information regarding the services 116, 118). In some cases, application or service-specific monitoring may be implemented, based on the needs of the application/service.

Although the system monitor 128 is illustrated in FIG. 1 as a separate component from the sensor network 102, it should be understood that some or all of the system monitor 128 may be implemented at the service level on one or more of the devices 104, 106, 108, 110 of the sensor network 102. For example, the service 118 may be a locally-deployed monitor service that is operable to collect and report information about a current status of the CPU 112, or the memory 114, or some other local characteristic of information.

Thus, in the example of FIG. 1, the system monitor 128 is operable to determine and provide device metadata 130. For example, the device metadata 130 may include a description of a corresponding device of the devices 104, 106, 108, 110, where the description may be constructed according to an ontology and/or schema that is known to the service mapper 126 and common to the various devices 104, 106, 108, 110. Additionally, or alternatively, the device metadata 130 may be collected in a device-specific format or structure for each of the devices 104, 106, 108, 110, and may thereafter be converted into such a common schema for use by the service mapper 126. For example, the device metadata may include a description of various technical capabilities of the devices 104, 106, 108, 110, provided in an eXtensible Markup Language (XML)-based language, e.g., according to a defined XML schema. Of course, other formats, languages, and/or structures may be used, as well.

More generally, the device metadata 130 may include, for example, a device description, a software description, a hardware description, and a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of the CPU 112 (e.g., name or speed), memory 114 (e.g., total amount of memory), or connection capabilities (e.g., connection speed or connection type) of the device(s). The device status may include more volatile information, including a device location, current CPU usage, or remaining power or memory. Of course, other device aspects or information may be included in the device metadata 130, as described below and/or as would be apparent. For example, the device metadata 130 may include information about other devices, such as where the device 104 includes (or is associated with) an RFID reader, and the device metadata 130 may include a description of types of RFID tags that may be read and/or written to by the RFID reader.

Also, although the device metadata 130 is illustrated in FIG. 1 as being determined by the system monitor 128, it should be understood that at least the static device constraints (e.g., total memory or vendor information) may be stored separately, e.g., in a device (metadata) repository (not shown in FIG. 1), similar to the service repository 120. Such a device repository also may be used to store device metadata recently collected by the system monitor 128 (e.g., dynamic but slowly-changing, recently-collected device metadata).

Using at least the service metadata 124 and the device metadata 130, the service mapper 126 may map a given service onto one or more of the devices 104, 106, 108, 110 of the sensor network 102. Such a mapping is designed not only to value-match various aspects of the service metadata 124 and the device metadata 130, where necessary (e.g., matching a required memory specified in the service metadata 124 with a device memory specified in the device metadata 130), but also to enable and optimize a deployment and execution of the service in question. For example, it may be the case that both the device 104 and the device 110 are nominally or ostensibly capable of running the service 116 (e.g., both devices 104 and 110 may possess some minimum required values of memory, processing capabilities, or power). However, it may be the case that the service 116 is more power-hungry than memory-hungry (or vice-versa), so that the service mapper 126 may map the service 116 to the device 104 if the device 104 is currently able to provide more power relative to the other candidate device 110, even if the device 110 currently provides more free memory than the device 104.

Thus, the service mapper 126 may be operable to determine (or attempt to determine) which of the matching or candidate devices is quantitatively and qualitatively best-suited to perform the function of the service in question. For example, a fulfillment priority may be applied that assigns a numeric weight or other priority information to one or more attributes of the service metadata 124 and/or the device metadata 130, so that the service mapper 126 may perform mapping of the associated service(s) accordingly. Of course, many different criteria may be associated with the fulfillment priority, such as, for example, information about a certain type or brand of device, or device platform, that is known to provide some advantage or benefit in executing a service to be deployed, e.g., in terms of reliability. Therefore, in such an example, all devices of this type, brand, or platform may be assigned corresponding priority information.

The system monitor 128 also may determine network metadata 132, such as, for example, various network parameters, particularly where such parameters are dynamic and not necessarily discernable from information about any single device. One such example of the network metadata 132 may include available bandwidth on the sensor network 102. Other examples include location information, mobility characteristics of the network as a whole, and reliability of network connections.

In performing the service mapping, the service mapper 126 also may access other information deemed to be useful or required for the mapping. For example, deployment constraints 134 may include various constraints applicable to one or more services, service deployments, and/or to the sensor network 102 itself. For example, and as discussed in more detail below, the deployment constraints may include constraints requiring a maximization of battery life or battery usage in the sensor network 102, or may otherwise govern service deployment aspects that may be generic to a plurality of services and/or to a plurality of the devices 104, 106, 108, 110. Thus, the deployment constraints may provide a global or governing strategy for executing a given service mapping/deployment.

Once an appropriate service mapping has been performed by the service mapper 126, a service injector 136 may be used to install and start/activate the mapped service (e.g., the service 116) on the device 104. The service injector 136, more generally, also may be used to manage a life cycle of the service(s), e.g., by performing service updates or stopping the service when necessary.

Thus, one task of the service injector 136 is transferring concrete service code (e.g., an appropriate one of the service executable(s) 122) to the selected/mapped device(s). Thus, the service injector 136 receives and installs the kind of code in question. Such an install component as the service injector 136 may be installed on the device-side, e.g., as a single standalone software component, or may cooperate with other installation components in order to distribute instances of the (mapped) service executables 122. After installing the instances of the service executable(s) 122, the service 116 may be kept in an inactive state until the service injector 136 sends a start-up signal to change the service 116 to an active state. In a similar way, the service injector 136 may be used to organize the updating, stopping, or removal of services. Once mapping of the service 116 has occurred, and the service 116 has been installed and started on the device 104, then execution of the service 116 may continue, as needed.

In the following examples, reference is made to a service 138 that is to be deployed onto one or more devices of the sensor network 102. That is, it is assumed that a request for a mapping and deployment of the service 138 has been received, so that subsequent mapping by the service mapper 126 may proceed accordingly. As such, and from the above explanation, it should be understood that the service 138 may ultimately be deployed to whichever of the devices 104, 106, 108, 110 is determined to be best-suited for execution of the service 138. In the examples below, the service 138 is generally discussed as being mapped to, and deployed to, at least the device 104, as shown in FIG. 1.

In performing the mapping as just described, the service mapper 126 may include a mapping system 140. As described, the mapping system 140 may be operable to receive a request for a service deployment (e.g., from a user entering a request to deploy a specified service, or in conjunction with the business process(es) that requires a service to be deployed). Based on the request, the mapping system 140 may determine that a service 138 should be mapped and deployed onto at least one device of the sensor network 102, and, accordingly, may determine the service executable of the service 138, as well as associated service metadata, from the service repository 120. Current device metadata 130 may then be obtained for some or all of the plurality of devices 104, 106, 108 110, e.g., using the system monitor 128. Then, the mapping system 140 may determine a selected device (e.g., the device 104) from the plurality of devices 104, 106, 108, 110, based on the service metadata 124 and the device metadata 130 (and/or based on the network metadata 132).

In some cases, however, it may be the case that such a mapping and deployment initiated by the mapping system 140 may not succeed, or may only partially succeed. For example, as should be understood from the above description, an allowable deployment condition 142 may be required to exist at a time of the deployment, in order for successful deployment of the service 138 to occur. The allowable deployment condition 142 may include, for example, that the deployment constraints 134 are met, or that service requirements (specified in the service metadata 124) associated with the service 138 may adequately be met by device constraints (specified in the device metadata 130) associated with a device(s) of the sensor network 102. In the latter case, for example, the service 138 may require a certain amount of free memory, or a certain processor speed, so that device constraints associated with a given device, such as the device 104 (e.g., with the memory 114 or the CPU 112) may not be sufficient to satisfy the service requirement(s), particularly given that the services 116, 118 are already being hosted and run by the device 104.

When the initiated mapping and/or deployment at least partially fails, or is predicted to fail, the mapping system 140 may be operable to alter an existing deployment condition at the time of the failure to obtain a modified deployment condition 144, and to deploy the service 138 based on the modified deployment condition 144. For example, the mapping system 140 may alter an initial deployment condition by changing (e.g., reducing) service requirements of the service 138, by reconfiguring the sensor network 102, by removing currently-deployed services from the sensor network 102, or by changing one or more of the deployment constraints 134. Thus, by altering the existing or initial deployment condition to obtain the modified deployment condition 144, the mapping system 140 may be allowed to proceed with the mapping and deployment of the service 138. By way of such active intervention during service mapping and deployment, business processes may be enacted in a more reliable way. For example, the service mapper 126 may be operable to overcome deployment obstacles and failures that may otherwise prevent deployment of the services (e.g., the service 138) onto the sensor network 102.

In the example of FIG. 1, then, it should be understood that the terms "deployment condition," "modified deployment condition," "allowable deployment condition," or similar terms, may refer at least in part to condition(s) of physical conditions existing (or desired/required to be existing) with respect to the sensor network 102, such as a number or type of services deployed on the sensor network 102, an amount of the memory 114 existing or available for deployment of additional services, or a deployment constraint. In other words, such deployment conditions may overlap or encompass, in the context of a particular deployment at a particular time, some or all of the service metadata 124, the device metadata 130, the network metadata 132, or the deployment constraint(s) 134. Thus, such deployment conditions may represent a matching or fulfillment (or lack thereof) between the service metadata 124, the device metadata 130, the network metadata 132, or the deployment constraint(s) 134, for (in this case) deployment of the service 138 onto the sensor network 102. As such, such deployment conditions may be represented, in whole or in part, as, for example, XML documents that describe the associated physical conditions for use by the mapping system 140 (as represented by the allowable deployment condition 142 and the modified deployment condition 144 of FIG. 1), where parameters of such XML documents at a given time may be determined from the service repository 120, the system monitor 128, and the deployment constraints 134.

As just referenced, the service mapper 126 may be operable to implement various strategies and techniques for actively intervening with a failed deployment to alter a non-allowable deployment condition and obtain an allowable deployment condition. For example, as referenced above, the service 138 to be deployed in the example of FIG. 1 may be associated with the service metadata 124, which may include requirements of the service 138 that are needed for the service 138 to be successfully deployed and executed. Each such requirement may be provided within the service repository 120 as a range of acceptable values (e.g., from a minimum to a maximum acceptable value(s)), rather than as a single value. For example, the service 138 may be associated with service requirements specifying that the service 138 should be deployed only to a device having available memory, battery power, and/or transmission speed within certain specified ranges, e.g., min-max ranges.

Accordingly, the service mapper 126 may include, or be associated with, requirement reduction logic 146, which may be operable to alter a current deployment condition by reducing the service requirements within their respective ranges. For example, if an initiated deployment fails, then the mapping system 140 may access the requirement reduction logic to determine whether or how to begin reducing the relevant service requirements. For instance, in one specific implementation, the service 138 may be associated with five service requirements. Upon a determined failure of the mapping or deployment of the service 138, the mapping system 140 may access the requirement reduction logic 146 to determine an order for reducing one or more of the five service requirements, as well as to determine an extent to which each of the service requirements may be reduced.

Since each service requirement may be associated with a fulfillment priority, the requirements reduction logic 146 may specify that the service requirements having the lowest fulfillment priority (i.e., the least important service requirements) should be reduced first and/or most. Periodically during the requirements reduction process, the mapping system 140 may attempt to determine whether the service requirements have been sufficiently reduced to permit deployment of the service 138, and, if so, may proceed with the deployment. If not, then the requirements reduction may continue, down to the respective minimum-allowed values, and possibly including the entire elimination of at least some of the (e.g., lower priority) requirements.

As an additional or alternative strategy for altering a non-allowable deployment condition, the service mapper 126 may reconfigure or reorganize the sensor network 102. For example, the service mapper 126 may include network reconfiguration logic 148 that is operable to implement one or more algorithms for re-organizing the sensor network 102, e.g., by re-locating services of the sensor network 102 so as to enable deployment of the service 138.

In one example illustrated in FIG. 1, it may be the case that the service mapper 126 first attempts to map and deploy the service 138 onto the sensor network 102, and, in so doing, may determine that the device 104 is the most likely candidate device for receiving the service 138 (due to, for example, local capabilities/functionalities of the device 104, or due to the device 104 (and associated device constraints) being closest of all available devices to matching the service requirements associated with the service 138. Nonetheless, the deployment may fail if a current deployment condition includes a condition in which, for example, available memory of the memory 114 is insufficient for deployment of the service 138.

Accordingly, the network reconfiguration logic 148 may determine that at least the device 110 may suitably execute the service 116, and the mapping system 140 may then alter the current deployment condition by re-locating or re-mapping the service 116 from the device 104 to the device 110, thereby obtaining the modified deployment condition 144. As a result, a corresponding amount of the memory 114 may be freed, and the allowable deployment condition 142 may be reached in which the service 138 may be deployed to the device 104.

The algorithms executed by the network reconfiguration logic 148 may vary in type and complexity. For example, in attempting to deploy the service 138, the network reconfiguration logic 148 may execute an algorithm in which all services of the sensor network 102 that are allowed to be re-mapped to other devices are removed from the sensor network 102, and then are re-mapped onto the devices 104, 106, 108, 110 in a manner designed to make efficient use of the resources of the sensor network 102, while freeing space on at least one device, e.g., the device 104, for deployment of the service 138 thereto.

As another example, the network reconfiguration logic 148, in response to a failed deployment of the service 138, may not initially remove or re-map any services from the sensor network, but, rather, may input and analyze data from the system monitor 128 to determine which of the devices 104, 106, 108, 110 is/are closest to being able to meet the allowable deployment condition 142. Then, a reduced subset of the devices 104, 106, 108, 110 of the sensor network 102 may be obtained, and actual re-mapping of services may take place only among the subset. In this way, valuable communication and computational resources of the sensor network 102 may be conserved.

In execution of the network reconfiguration logic 148, associated algorithms may generally be subject to the deployment constraints 134. As described above, the deployment constraints 134 may generally refer to globally-applicable constraints, i.e., may refer to global constraints associated with the sensor network 102. Examples of the deployment constraints 134, as also referenced above, may include constraints requiring that all deployments (or a certain deployment): minimize battery usage, minimize memory usage, or minimize usage of processing power.

As with the requirement reduction logic 146, algorithm(s) of the network reconfiguration logic 148 may associate priority information with each of the deployment constraints. For example, in the deployment of the service 138, the deployment constraints 134 may designate that it is more important to minimize memory usage, or may designate that it is more important to minimize battery usage, even if sub-optimal memory usage or processing power occurs as a result. Thus, in the latter case, for example, the network reconfiguration logic 148 may select the device 104 as being extremely power-efficient, and may thus determine that the device 104 is potentially well-suited for deployment of the service 138.

Meanwhile, it may be the case that the service 116 may be run on the device 110 with little or no modifications (e.g., where the service 116 includes a temperature detection service, and where both the devices 104 and 110 are in a position to detect the temperature in question). Consequently, the mapping system 140 may re-map the service 116 to the device 110, as shown, and may thereafter determine that the resulting (modified) deployment condition 144 of the sensor network 102 now matches the allowable deployment condition 142, and permits deployment of the service 138 onto the device 104. That is, the movement of the service 116 to the device 110 essentially frees resources (e.g., the memory 114) on at least one device, e.g., the device 104, and the mapping system 140 may then make use of the freed resources of the device 104, including actually deploying the service 138 thereto.

Although the above-described examples primarily contemplate movement of only the service 116, it should be understood that the network reconfiguration logic 148 may be responsible for re-organizing a larger set of deployed services, in order to obtain the modified deployment condition 144 for deployment of the service 138. In so doing, the network reconfiguration logic 148 also may take into account the various classes and types of deployed services. For example, as referenced above, the deployed services may include certain enabling services that may not be removed from an associated device without severely restricting an operation of the associated device and/or the sensor network 102 as a whole. For instance, it may be the case that the service 118 is associated with a component or functionality of the service injector 136, so that removal of the service 118 would thereafter render it impossible to inject new services onto the device 104. As a result, the network reconfiguration logic 148 and associated algorithm(s) may include logic for ensuring that the service 118 is not re-mapped or removed from the device 104.

Finally in the implementation of the service mapper 126 shown in FIG. 1, component removal logic 150 may be implemented by the mapping system 140 to remove services or service components entirely from the sensor network 102, and thereby, again, alter an initial deployment condition (e.g., freeing network resources) to obtain the modified deployment condition 144 that satisfies the allowable deployment condition 142.

For example, the component removal logic 150 may implement algorithms to determine which (and how many) such services to remove from one or more of the devices 104, 106, 108, 110 of the sensor network 102. In some implementations, the component removal logic 150 may, for example, assign, associate, or determine priority information for each service deployed on the sensor network 102. Such priority information may be specified in, or based on, the service metadata 124, the deployment constraints 134, or may be determined from input received from a user of the system 100, or may be determined based on the back-end business logic. For example, such priority information may specify that services should be removed having low priority relative to other services, or may indicate removal of services that consume relatively more memory, or relatively more power.

The mapping system 140 may implement the component removal logic 150 to first determine whether the resources to be released by removal of one or more services will be sufficient to deploy the service 138. If not (and assuming for the example that the service 138 is to be deployed in an all-or-nothing fashion), then no services are removed from the sensor network 102, and a source of the request for deployment of the service 138 (e.g., a user of the system 100, or an application communicating with the system 100) may be notified. If the resources to be freed will be sufficient, then the mapping system 140 and the service injector 136 may proceed with removal of the determined services, and with subsequent deployment of the service 138. For example, it may be the case that the service 116 may not satisfactorily be run on any available device other than the device 104, and therefore may not be re-located within the sensor network 102. In this case, if the service 116 is not critical for implementing business logic associated with the sensor network 102, then the service 116 may be removed from the sensor network 102 entirely, and the service 138 may be deployed onto the device 104 in its place.

As shown in FIG. 1, the service mapper 126 may include software to be executed, in whole or in part, on a computer 152, such as a personal computer, workstation, or on any suitable computing device. For example, a user or administrator may install some or all of the service mapper 126 software onto the computer 152, and may interact with the service mapper 126 software using a graphical user interface (GUI) viewed on an associated display. In another example, some or all of the service mapper 126 may be installed on a remote computer, over a wide area network such as the Internet, and the user may access the service mapper 126 over the network, e.g., as a web-based graphical user interface.

For instance, such GUIs, whether local or web-based, may include fields or other input/output techniques that allow the user to set the deployment constraints 134, alter the service metadata 124, or develop/modify and/or register a service executable with the service repository 120. The user also may use the GUI, or another suitable user interface(s) to, for example, initiate a service mapping (such as selecting a service and/or sensor network for a desired mapping), or to set parameters associated with the service mapper 126 (e.g., parameters associated with the requirement reduction logic 146, network reconfiguration logic 148, or component removal logic 150, including priority information).

The service mapper 126 may be in communication with business processes executing in whole or in part on the computer 152, or executing on a remote computer and/or network. For example, the business processes may be located at a corporate headquarters, and the sensor network 102 may represent one of many (types of) networks that may be dispersed across a large geographical region connected by a wide area network.

Thus, any or all of the back-end business processes, the service repository 120, the system monitor 128, the service injector 136, or the sensor network 102, may be dispersed from one another across a relatively large geographical area that is connected by a wide area network, which may include, for example, the Internet or an enterprise-wide proprietary network. The service repository 120, the deployment constraints 134, the service injector 136, and the system monitor 128 may be installed in whole or in part on the computer 152, e.g., may be stored in a memory of the computer 152. For example, the system monitor 128 may include a server component, e.g., an application server, executing on the computer 152. At the same time, as referenced above, at least portions of, for example, the service mapper 126, the system monitor 128, and the service injector 136 may be stored/executed on a separate computing device, including, for example, a portable computing device (e.g., a laptop computer or personal digital assistant (PDA)), or may be stored/executed on one or more of the devices 104, 106, 108, 110 of the sensor network 102.

Techniques for communication between the computer 152 (or other just-described examples or variations of the computer 152) with devices of the sensor network 102 may vary, for example, on the types of devices. For example, the devices and/or embedded systems may represent anything from small-scale, one-chip microcomputers, all the way to full-blown PC hardware. Thus, for example, for devices that have the capabilities of a mobile phone or more (e.g., are able to run a Java Virtual Machine™ or other middleware platform(s)), implementation may be performed in Java™ and/or based on the Open Services Gateway initiative (OSGi), which represents a known framework for implementing a component model for remote installation and management of applications and/or application components.

Figure 2:
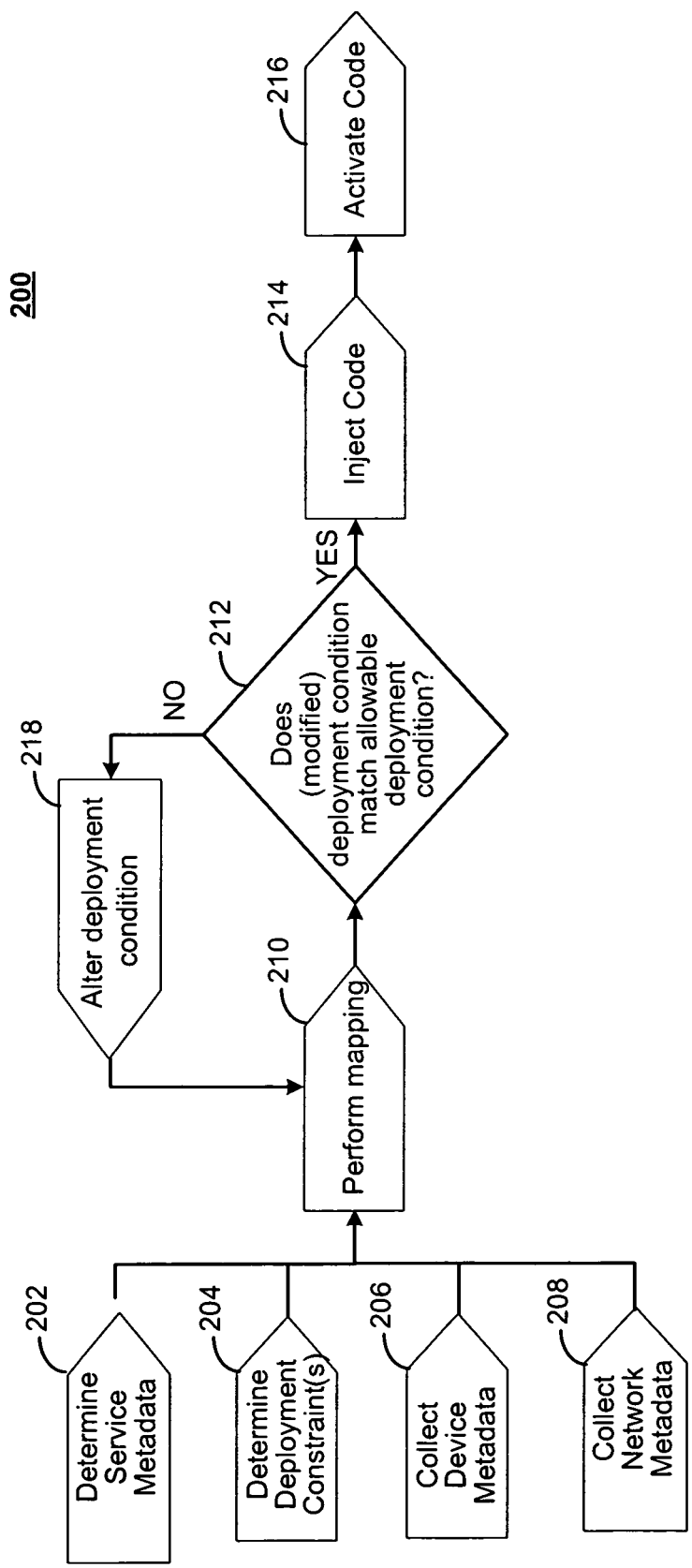
FIG. 2 is a flowchart illustrating example operations of the system of FIG. 1.

FIG. 2 is a flowchart 200 illustrating example operations of the system of FIG. 1. In FIG. 2, as referenced above, the associated processes and operations may be initiated or requested by users or business applications that wish to use particular (e.g., currently not running) services of the sensor network 102 (e.g., services registered with the service repository 120). As also referenced above, changes within the sensor network 102 also may initiate the processes and operations of FIG. 2, where such changes may include, for example, a software update, a removal or addition of a device (or service) from/to the sensor network 102, or a load balancing of (e.g., services of) the sensor network 102.

Thus, in FIG. 2, service metadata (202) is determined that, as described above, may include or reflect service requirements (e.g., processor type, available memory, or requested bandwidth) that potential devices should fulfill in order to be able to host a specified, associated service (e.g., to host the corresponding executable code component from the service executables 122 of the service repository 120). As described, at least some of these requirements may define an acceptable/tolerable range of a measurable property, such as, for example, available memory.

Similarly, deployment constraints (204) may be collected, such as the deployment constraints 134 that may include, for example, more global constraints, such as an expected number of devices that are preferred or required to host the service in question (in other words, a desired coverage of the sensor network 102). That is, for example, although the service 138 is illustrated in FIG. 1 as being deployed to the single device 104, it should be understood from the nature and possible uses of the sensor network 102 that, in many cases, instances of the service 138 may be deployed to a plurality of the devices 104, 106, 108, 110 of the sensor network 102. In this way, for example, a service for detecting temperature (or other physical or environmental parameter) may be deployed over a sufficiently-wide physical area. As another example, multiple instances of the service 138 may be deployed to different devices, in order to obtain a desired level of redundancy of the system 100.

Generally, then, the service metadata 124 (and associated service requirements) and the deployment constraints 134 represent information that may be stored and accessed from an appropriate memory or data store. For example, service requirements and any corresponding data may be specified by a developer of the service component(s), and stored in a properly-formatted file or database that is available to the service mapper 126. For example, although FIG. 1 illustrates the service metadata 124 stored in the service repository 120, with the deployment constraints 134 stored separately, it should be understood that any suitable storage scheme(s) may be used; for example, the service metadata 124 and the deployment constraints 134 may be stored together (or in association with one another) in a memory associated with a general requirements data storage.

However stored, the service requirements and the deployment constraints 134, or other requirements, may be associated with the above-referenced fulfillment priority, which is designed to indicate the importance of each associated type of requirement. For instance, such a fulfillment priority may indicate that the usage of a certain processor type (e.g., the CPU 112) may be more important than a remaining memory (e.g., memory remaining in the memory 114) after the installation of the service 138. As also referenced, such fulfillment priority information, as applied generally to services (and deployments thereof) of the sensor network 102, may be useful in active interventions for failed (or failing) deployments, and may be used, for example, in reducing the service requirements (within a range(s)), reconfiguring the sensor network 102, or removing service components from the sensor network 102.

Further in FIG. 2, a second type of basic input data includes information about currently-available capabilities of devices in the sensor network 102, or of the sensor network 102 itself. Accordingly, the device metadata 130 may be collected (206), which may include, for example, various static parameters (e.g., vendor name, CPU type, or list of installed/running service components), as well as various dynamically-changing parameters (e.g., remaining battery or memory) of one or more of the devices 104, 106, 108, 110 of the sensor network 102. Still further, the network metadata 132 may be collected (208), which may include, for example, information about the topology of the sensor network 102 (e.g., neighborhood relationships, or available bandwidth between devices).

As understood from the description of FIG. 1, the device metadata 130 and the network metadata 132 may be collected by the system monitor 128. For example, in one implementation, a monitoring process of the system monitor 128 may assume that the target devices 104, 106, 108, 110 have information regarding their capabilities and current status. For instance, the devices 104, 106, 108, 110 may store, continuously update (if required), and retrieve data relevant to monitoring. The system monitor 132 may either actively request relevant data from the devices 104, 106, 108, 110, and/or the devices 104, 106, 108, 110 may autonomously indicate changes in current configuration(s). For instance, the device 104 may include the service 118, which may be part of, or associated with, the system monitor 128, and which may indicate if a battery status (or virtually any other parameter) of the device 104 reaches a pre-defined level, e.g., a level determined to be critically low.

Based on the above-described input data (202-208), the service mapper 126 may execute a set of decisions regarding which devices of the sensor network 102 should host and run which service (executable(s)) (210). Then, it may be determined whether a (current or initial) deployment condition matches an allowable deployment condition (212). If so, then, for example, all of the specified service requirements of all of the service(s) (components), as well as the deployment constraints 134, may be fulfilled by currently-available devices. In other words, a proper matching may be found between the service(s) (or instances or components thereof) and the available devices 104, 106, 108, 110. For instance, the mapping process may have the result that the device 104 should host the service 138, or, in the case of multiple possible solutions, the service mapper 126 may choose one proper configuration, e.g., by choosing the configuration with the most remaining free resources (e.g., network wide).

Then, the output of the service mapping may include a set of instructions for performing code injection (214). Specifically, after successful mapping of service(s), the service injector 136 may be used to transfer executable service components to the respective selected devices. Depending on an available network infrastructure associated with the service network 102, the code injection may be performed, for instance, in a device-by-device fashion, in which the service injector 136 sends a message to the target node(s) containing appropriate commands, e.g., "remove the service 116 and install the service 138." In this case, the appropriate service executable may be transmitted to the device 104 from the service repository 120.

Once a device receive a certain set of commands and services from the service injector 136, the service may be activated (216). Such activation may depend in part on the specific associated hardware platform associated with the device(s), which is referenced in more detail below with respect to FIG. 3.

However, the expected service requirements and device constraints may not be satisfied by the available devices; that is, a current or initial deployment condition may not, in fact, match the allowable deployment condition (212). In such cases, as described herein, the deployment condition may be altered to obtain the modified deployment condition 144 (218). For example, the service mapper 126, e.g., the mapping system 140, may apply the resource allocation procedures described herein, including, for example, reduction of values of the service requirements within allowed ranges, reconfiguration of the sensor network 102, and/or removing already-deployed services from the sensor network 102.

For example, the mapping system 140 may execute the requirement reduction logic 146, the network reconfiguration logic 148, and/or the component removal logic 150. For example, the requirement reduction logic 146 may include algorithms for, e.g., reducing service requirements of the service metadata 124 within specified acceptable ranges, based on associated fulfillment priority information. After setting a certain service requirement to a new reduced value, i.e., after altering the existing deployment condition to obtain the modified deployment condition 144, the mapping system 140 may try again to find a proper matching/mapping (210). Then, this reduction process may be stopped either after the mapping was successful, or after all available service requirements have been reduced to their respective minimum-allowed values. If the modified deployment condition sill does not match the allowable deployment condition (212), then single service requirements may be excluded from the mapping, in accordance to the fulfillment priority information.

In altering the deployment condition (218), the mapping system 140 also may execute the network reconfiguration logic 148, such as may occur, for example, when a new service is introduced/inserted into a saturated network and/or when the just-described reduction of service requirements (and/or the deployment constraints 134) fails. In other words, the mapping system may begin with a particular service-device configuration, e.g., without the service 138, and may thereafter determine a new, allowable service-device configuration setting that also includes the new service 138. During such operations, the mapping system 140 may, again, execute the requirements reduction logic 146, in order to find a proper matching/mapping. As a result, a changed configuration of a certain sub-set of devices may be achieved in which new/different devices host different services.

As a final example of an active intervention for ensuring successful service deployment onto the sensor network 102, the mapping system 140 may implement the component removal logic 150. For example, the mapping system 140 may determine services (e.g., the service 116) to be completely removed from the sensor network 102, in order to allocate the requested/necessary amount of free resources for the to-be deployed new services (e.g., the service 138). Accordingly, not only single instances of the service 116 in question will disappear from the sensor network 102, but also all instances/service related to a given type of component may be completely removed from an execution environment of the system 100.

The loop of performing mapping (210), determining whether a (modified) deployment meets an allowable deployment condition (212), and altering the deployment condition (218), may be performed as many times as necessary or desired to obtain a desired result. Accordingly, the various intervention techniques may be implemented in various different orders or combinations. For example, removal of services from the sensor network 102 may be performed in combination with the network reconfiguration of the sensor network 102. As another example, the intervention strategies may be performed in a pre-defined order, such as, for example, requirements reduction, followed by network reconfiguration, followed by service (component) removal. These and other orders or combinations of intervention strategies may be used, as would be suitable in a given scenario, or as otherwise would be apparent.

Figure 3:
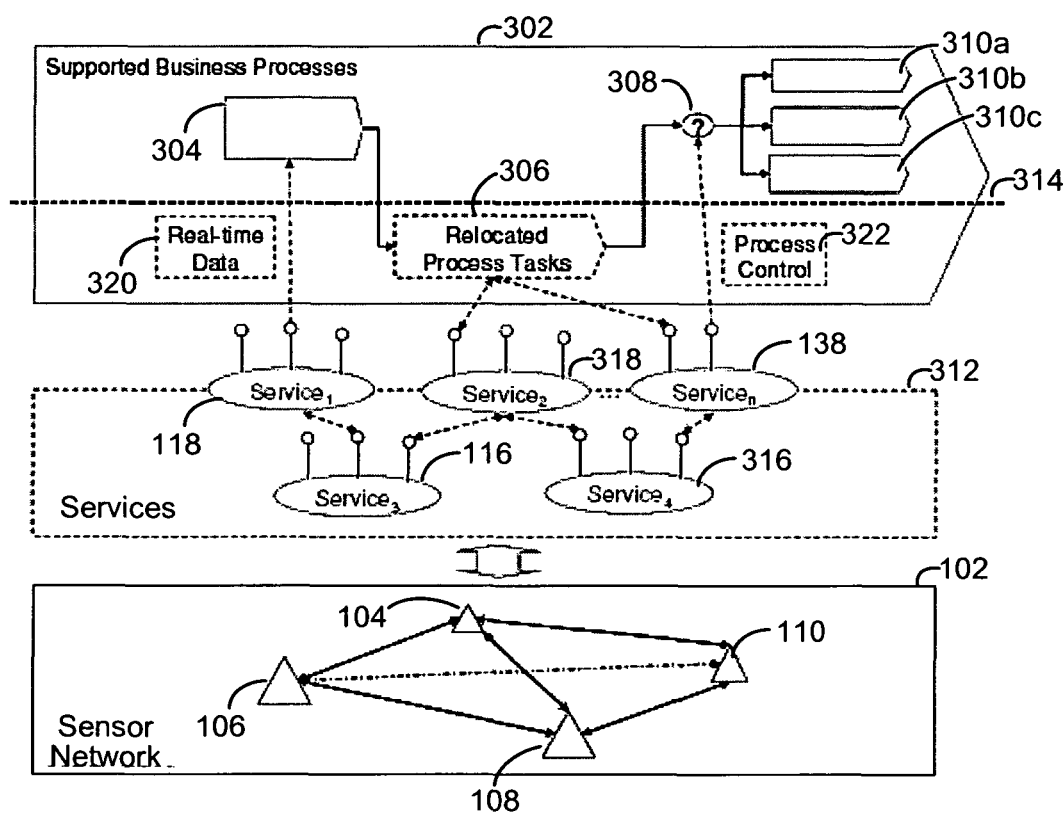
FIG. 3 is a block diagram illustrating a run-time environment of the system of FIG. 1.

FIG. 3 is a block diagram illustrating a run-time environment 300 of the system 100 of FIG. 1. As such, FIG. 3 illustrates, for example, a possible result of the operation(s) of the flowchart 200 of FIG. 2 on the system 100 of FIG. 1, and, moreover, provides context for the more detailed example scenarios discussed below with respect to FIGS. 4 and 5.

In the example of FIG. 3, a business process 302 should be understood to refer to workflow(s) that may include nodes 304, 306, 308, and 310a-310c, which may include or represent, for example, logically-related tasks or activities of the workflow, or control nodes of the workflow, where the workflow is generally used to transform input resources (e.g., materials, energy, or information) to obtain a business-relevant outcome (e.g., a product, or a component that contributes to the creation or delivery of products or services). For example, the business process 302 may include a Supply Chain Management (SCM) process, or a Hazardous Chemical Management process.

Many such business processes exist in the context of existing enterprise software solutions (i.e., back-end solutions); however, as described herein, the distributed, service-oriented architecture of, e.g., FIG. 1, provides seamless integration of such existing business processes (and other business processes) into distributed, smart item-based sensor networks. Thus, the business process 302 may be decomposed into, and expressed using, discrete services, which may then be flexibly and (at least partly) automatically deployed onto the sensor network 102. As a result, the business process 302 may be executed more quickly and reliably, and information may be provided, virtually in real-time, from sites at which business of the enterprise is conducted; moreover, such information may be provided in a substantially platform-independent and/or language-independent manner.

In the business process 302, the node 304 may represent a task executed by a back-end business software system, while the node 306 may represent tasks of the business process 302 that are relocated to the sensor network 102 (e.g., through the service-to-device mapping techniques described herein). The node 308 represents a control or decision point at which the business process 302 may take one of at least three possible courses of action, represented by the nodes 310a, 310b, and 310c.

In FIG. 3, a service layer 312 illustrates the various deployed services, without specifically illustrating the specific relationships between (e.g., deployments to) the devices 104, 106, 108, 110 of the sensor network 102. As may be seen, then, the business process 302 may be considered to be split into at least two parts, i.e., a first part that is above a line 314 and that is executed at the back-end enterprise system, and a second part that is below the line 314 and that is deployed onto the sensor network 102 for execution on the devices 104, 106, 108, 110. Thus, the line 314 may represent a technological and semantic border between the back-end system(s) and the sensor network 102.

In other words, the relocated process tasks of the node 306 are executed by the services of the service layer 312, which, in the example of FIG. 3, include the services 116, 118, and 138 of FIG. 1, as well as services 316 and 318. As illustrated in FIG. 3, services may either be implemented as single or atomic services that are substantially self-contained in their execution, or may be implemented as composite or combined services, so that services running on different devices of the sensor network 102 may collaborate to form composite services that a single service/device may not be capable of offering in a proper or efficient way. For example, the service 318 of FIG. 3 is illustrated as utilizing the service 116 and the service 316, where each of these three services may be executed on different devices of the sensor network 102. As one specific example, the service 318 may collect and aggregate sensor data, e.g., room temperature, which may be measured and sent by each of the services 116 and 316.

Further in FIG. 3, services of the service layer 312 may be used to provide real-time data 320 and/or process control 322 to the business process 302, across the line 314. For example, the service 118, in this example, may include a monitoring service that reports real-time data including a current state of an associated device (e.g., a location or temperature of the device, or of an associated object). This data may then be used in the task 304, as shown. Further, the process control 322 may be provided to the (control) node 308, so that the business process 302 may proceed to an appropriate one or more of the possible nodes 310a, 310b, 310c, based thereon.

Services of the service layer 312, as referenced above, may be split into two parts, i.e., a description part (including, for example, the service metadata 124), and an implementation part (such as the service executables 122). The description may specify one or more of an associated interface(s), protocols, ports, messages, or type of the service. The implemented part should generally perform in a manner consistent with the description, particularly for use between heterogeneous platforms.

One type of service that may be used in the service layer 312 includes web services. Although other types of distributed services also may be used (examples provided below), description is provided with respect to web services with the understanding that similar or analogous concepts and implementations may apply in the context of other types of services. For example, as just referenced, services generally supply a uniform description to help ensure successful interaction, and, in the case of web services, such a description may be based on the Web Services Description Language, or WSDL. Then, the description may be used by one service to call another, e.g., by sending a Simple Object Access Protocol (SOAP) message or otherwise executing a Remote Procedure Call (RPC). SOAP, like WSDL, may be expressed in XML, and, using the above techniques, services may interact in a manner that abstracts from specific platforms, while still ensuring interoperability.

In some implementations, a set of possible service descriptions may be restricted, in order to conserve the limited resources of the sensor network 102. For example, the Universal Plug-n-Play (UPnP) standard, which also may describe services in XML (e.g., utilizing SOAP as an implementation of a RPC), may reduce complexity by imposing certain constraints on possible service calls, and/or by allowing optimization of an execution environment by supporting only those services which may actually be needed in the environment.

Although the above implementations are provided as examples, it should be understood that the example should not be considered to be limiting. For example, any appropriate open standard(s) for interoperability in collaborating environments may be used, other than UPnP. More generally, virtually any device and/or platform may be used in the system 100 and/or the environment 300 that, for example, provide sufficient computing power to run business logic, are programmable for receiving new services, provide sensing capabilities to obtain data (for input into the process(es) associated with the business logic), and that include a communication interface to enable the collaboration of services. As should be understood, the active intervention techniques of FIGS. 1 and 2 may be used to help ensure that services of the service layer 312 reliably include the services that are judged to be most important for execution of the business process 302, and that such services are deployed onto devices of the sensor network 102 in a manner that minimizes efforts of a user or administrator of the system 100.

Figure 4:
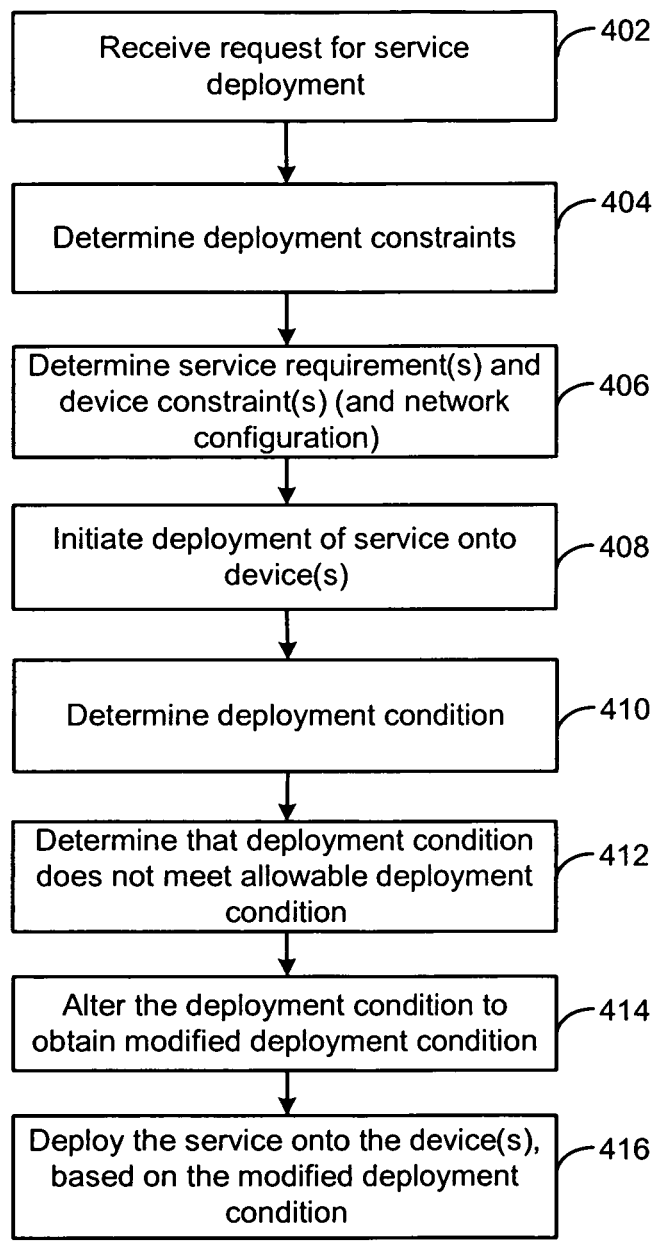
FIG. 4 is a flowchart illustrating additional examples of operations of the systems of FIGS. 1 and 3.

FIG. 4 is a flowchart 400 illustrating additional examples of operations of the systems of FIGS. 1 and 3. In FIG. 4, a request for a service deployment is received (402). For example, a service mapping request may be received at the service mapper 126. For instance, an administrator or other user, or another system component (e.g., the system monitor 128), may request the mapping of a specified service to an appropriate device(s). Such a request may take various forms. For example, the administrator or other system component may request mapping of a specific service to one or more explicitly-identified devices, or may request deployment of a service on all (available) devices. The administrator or other system component also may request mapping and deployment of a service to some specified number or percentage of devices. Additionally, or alternatively, the administrator or other system component may specify that the service should be specified on the "best" device or devices for a given context, e.g., according to specified priority information, including the deployment constraints 134.

In accordance with the latter example, the deployment constraints 134 may be determined (404). For example, the mapping system 140 may access the deployment constraints 134, which, similarly to the service metadata 124 and the device metadata 130, may be specified by way of an XML document having a pre-determined XML schema and specifying the deployment constraints 134.

Similarly, the service requirements and device constraints (and possible network configuration information) may be determined (406). For example, as just referenced, the mapping system 140 may access the service metadata 124, including the service requirements as an XML document from the service repository 120, and also may similarly obtain the device metadata 130, including the static and dynamic device constraints currently existing in the sensor network 102 (as determined by the system monitor 128). As should be apparent, the network metadata 132 also may be accessed/determined in a similar manner.

A deployment of the specified service(s) onto devices of the sensor network 102 may then be initiated (408). For example, the mapping system 140 may proceed with matching the determined service requirements and device constraints. For example, if the service requirements and device constraints are provided in respective XML documents according to a pre-determined XML schema, then parameters and values for, e.g., memory, power, and processing power may be matched against one another (and against an XML document associated with the deployment constraints 134) to determine some sub-set of devices of the sensor network 102 that may be capable of receiving and executing the service(s) in question.

Accordingly, a deployment condition may be determined (410). For example, a composite XML document may be formed as a result of the matching operation(s) just described, and from such a document (or merely from an actual failure of the deployment), it may be determined that the deployment condition does not meet the allowable deployment condition 142 (412). Such a determination may be a binary decision in which only success or failure is determined. In other examples, there may be degrees of success or failure; e.g., only a certain number or percentage of desired devices may be able (or allowed) to receive deployment of the service. In other examples, the determination that the deployment condition does not meet the allowable deployment condition 142 may include an analysis of each XML document representing the device constraints of each potential device, and a selection of some subset of the devices that are closest to being in condition for deployment of the service in question.

Accordingly, the deployment condition may be altered to obtain the modified deployment condition 144 (414). For example, the mapping system 140 may execute the requirement reduction logic 146, the network reconfiguration logic 148, and/or the component removal logic 150. As a result, for example, the service metadata 124 (e.g., service requirements) may be altered, or, in other examples, a location of a currently-deployed service may be changed (while nonetheless maintaining the currently-deployed service on the sensor network 102), or, additionally or alternatively, one or more currently-deployed services may simply be removed from the sensor network 102. In other words, a requirement for resources of the sensor network 102 may be reduced, and/or an availability of the resources may be increased, so that the modified deployment condition meets the allowable deployment condition.

In some implementations, as described below with respect to FIG. 5, the mapping system 140 may execute the above-described strategies for active intervention in service-to-device mapping in a pre-defined order or combination, or may implement only a subset of the available strategies. The mapping system 140 may determine an order, combination, or (non)inclusion of such strategies, or other strategies, by accessing the deployment constraints 134, perhaps on a deployment-by-deployment basis.

Once the allowable deployment condition 142 is met, the service in question may be deployed onto the device(s), based on the modified deployment condition 144 (416). For example, the service injector 136 may be operable to inject, and later activate, the service in question. In some implementations, the service injector 136 may be selected based on a compatibility with a development platform with the service executable of the service.

Figure 5:
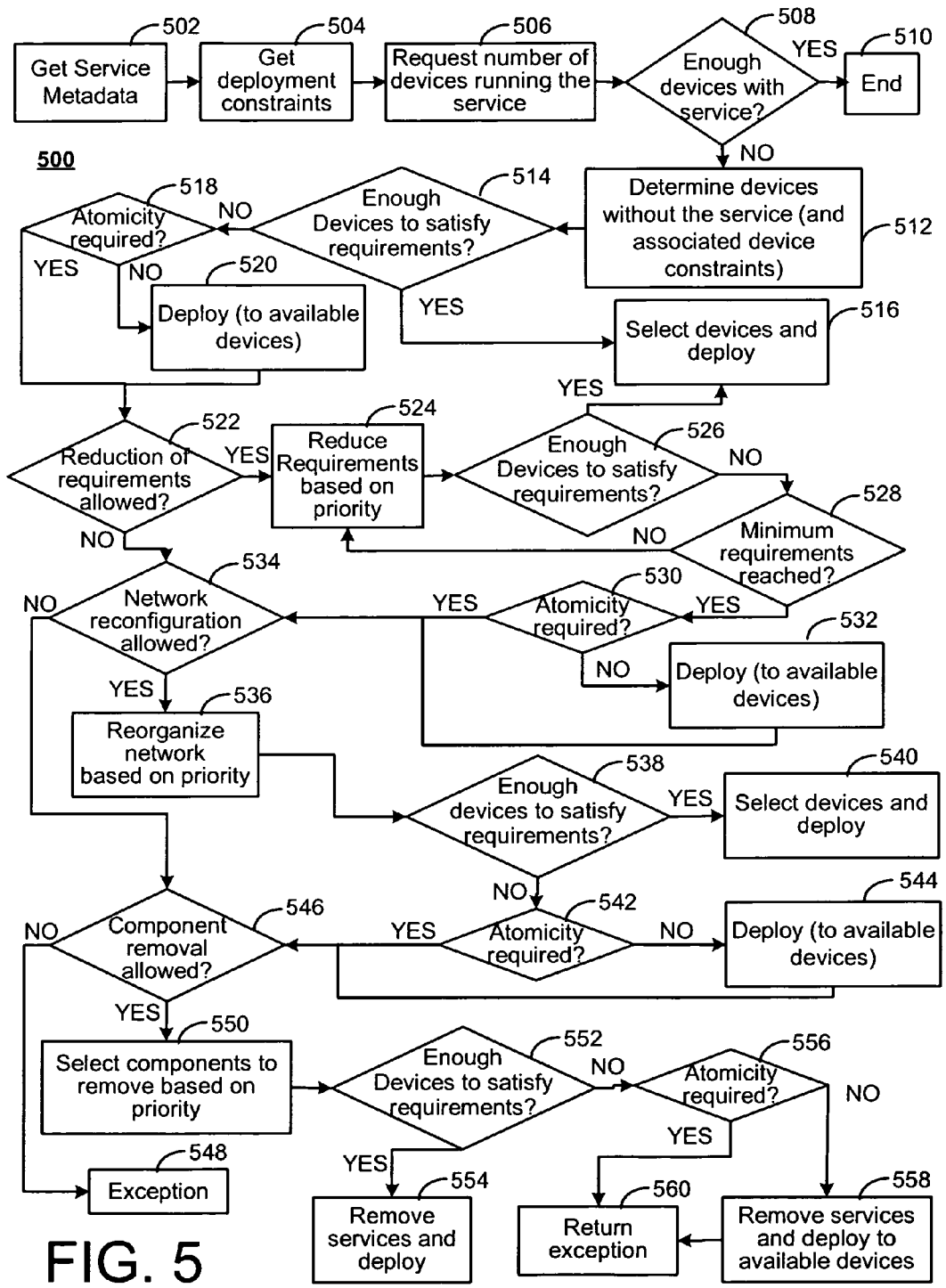
FIG. 5 is a flowchart illustrating examples of operations of the systems of FIGS. 1 and 3 in an example related to safe management of chemical drums.

FIG. 5 is a flowchart 500 illustrating examples of operations of the systems of FIG. 1 and FIG. 3 in an example related to safe management of chemical drums. Specifically, for example, chemical drums or other containers may be used in the oil and gas industry to store and transport potentially dangerous chemicals. For example, certain chemicals may combust above a certain temperature or pressure. In another example, it may be the case that certain pairs or groups of chemicals should not be stored too closely to one another, due to dangers related to potential mixture of the chemicals. Further, radioactive material should also be closely monitored to ensure safety and well-being of nearby workers or visitors.

In such scenarios, then, the devices 104, 106, 108, 110 may include devices attached to or otherwise associated with the chemical drums. For example, the services 116, 118, 138 may represent temperature/pressure collection services, and, more generally, each device may be equipped to store, retrieve, or provide information on the specific content of its associated drum (e.g., chemical composition or total volume), as well as to autonomously recognize potentially dangerous situations. Thus, the services 116, 118, 138 may represent examples of the relocated business tasks of the node 306 of FIG. 3, so that functionality of the services 116, 118, 138 may be understood to provide, for example, safety-critical alerts to trigger manual or automated processes that are implemented by an associated back-end system.

In the example of FIG. 5, a temperature-detection service is to be mapped and deployed onto the sensor network 102 in the above scenario. In this case, service metadata for the temperature-detection service is determined (502). For example, the service mapper 126 may communicate with the service repository 120 to determine a relevant subset of the service metadata 124. In this example, the service metadata 124 may include service requirements of the temperature-detection service, such as, for example, a number or percentage of devices of the sensor network 102 that are to receive the service, and a range of possible values (e.g., ranges of processing power, memory, bandwidth, or battery power) of a device of the sensor network 102 needed for implementing the service on a given device. The service metadata 124 also may include priority information associated with each range of values, indicating a relative level of importance of each type of value.

Relevant deployment constraints, e.g., from the deployment constraints 134, also may be determined (504). For example, the service mapper 126 may determine that deployment constraints are in place specifying a global preference or requirement for using a certain hardware or software platform that may be associated with some of the devices 104, 106, 108, 110 of the sensor network 102. Other examples of such relevant deployment constraints might include a requirement that there be a certain amount of available bandwidth on the sensor network 102 for deployment of any new service, or that new services should be deployed to devices having a certain level of available battery power (e.g., specified as a numeric threshold, or as devices having the highest-available power levels). Although the example of FIG. 5 illustrates the determination of service metadata prior to the determination of deployment constraints, it should be understood that these operations may be performed in a different order, or concurrently (similar comments apply to the remainder of FIG. 5, and through this description, unless context specifies to the contrary).

A number of devices currently running the service in question, if any, may then be determined (506). For example, it may be the case that a number of devices/drums in an area are running the temperature-detection service, but that transportation of additional or different chemicals into the area may initiate a possible mapping/deployment of additional instances of the temperature-detection service (e.g., to ensure adequate coverage of the area). In this case, the service mapper 126, perhaps using the system monitor 128, may poll the devices 104, 106, 108, 110 to determine a current deployment status of the temperature-detection service. If it turns out that a sufficient number of devices are currently running the service (508), then there may be no need for additional mapping/deployment thereof, and the mapping/deployment processes may end (510).

If, however, there are not enough devices currently running the service to be deployed (508), then the devices not running the service may be determined (512). For example, the service mapper 126 may instruct the system monitor 128 to query the sensor network 102, or the system monitor 128 may do so as part of its normally-scheduled operations. In so doing, the system monitor 128 may determine the relevant devices and associated device constraints, e.g., as part of the device metadata 130. Of course, the system monitor 128 also may determine relevant portions of the network metadata 132, as well.

If enough devices are discovered as being capable of satisfying the service requirements and deployment constraints for hosting and running the temperature-detection service (514), then the service mapper 126 may perform its normal mapping duties to map the service to appropriate ones of the devices, so that some subset of available devices may be selected for deployment thereto of the service (516). If not enough devices are present (514), then the service mapper 126 may determine whether atomicity is required for the current service deployment (518). That is, some services are associated with an "all-or-nothing," or atomic, deployment, so that, for example, the service deployment may specify a certain number of devices to receive the service (e.g., four), and the service will only be deployed if that number of devices is currently available. In other, non-atomic deployments, the service may be partially deployed, so that, in the above example, the service may be deployed only to one, two, or three devices, or however many devices are available for the deployment (520).

If atomicity is required (e.g., by the service requirements and/or the deployment constraints 134), then the service mapper 126 may not be allowed to deploy the service under the present deployment condition, and, instead, may proceed with attempts to perform active intervention in obtaining success in the deployment. In the example of FIG. 5, the active intervention begins with a determination of whether a reduction of requirements is allowed (522). For example, the mapping system 140 may execute the requirement reduction logic 146 to determine (e.g., from the service metadata 124 and/or the deployment constraints 134) whether it is permitted to reduce service requirements of the service in question in an attempt to lessen a required load of the devices 104, 106, 108, 110 of the sensor network 102. If so, then the requirements may be reduced accordingly (524). For example, the requirement reduction logic 146 may specify an order (i.e., priority) in which three different service requirements (e.g., battery power, processing power, and memory), each associated with a min-max range of values within the service metadata 124, may be reduced. In some cases, the required value of a given service requirement may be reduced down to the minimum allowed, or to some level higher than the minimum, or, in some cases, the service requirement may be removed entirely. For example, in the latter case, there may be a service requirement in place that a device should be able to run at least one (or more) other service(s) besides the temperature-detection service being deployed. However, if no such device meets this requirement, then the requirement may be eliminated.

Thus, the mapping system 140 may proceed with reducing the requirements (524), and, periodically or after each reduction (or at some other interval or event), the service mapper 126 may again use the system monitor to determine whether enough devices are now present to satisfy the (remaining) requirements (526). If so, then the service mapper 126 may perform its normal mapping processes to select appropriate ones of the available devices for deployment of the temperature-detection service thereto (516). If not, and if the minimum value(s) of the requirements being reduced have not yet been reached (528), then the mapping system 140 may continue executing the requirement reduction logic 146, e.g., may continue reducing the current or next-higher priority requirement(s) (524).

If the minimum (set of) requirements has been reached (528), e.g., each service requirement has been reduced to a minimum value and/or been removed (if allowed), then the service mapper 126 again determines whether atomicity is required (530). If not, then, as already described, the service mapper 126 may deploy the temperature-detection service to available devices (532). After which, or if atomicity is required, and since, by definition at this point in the flowchart 500, there are not yet enough devices to satisfy all of the requirements, then the process continues with a determination of whether network reconfiguration is allowed (534). Of course, if the reduction of requirements is not allowed (522) earlier in the process, then the process may proceed directly to the determination of whether to use network reconfiguration, as shown in the example of FIG. 5.

If network reconfiguration is permitted (534), then, for example, the mapping system 140 may execute the network reconfiguration logic 148 to reorganize the sensor network 102 (536). For instance, as already described, the mapping system 140 may remove some or all currently-deployed services, and may execute the network reconfiguration logic 148 to determine an improved distribution for (re-)deployment of the services, where the improved distribution includes a sufficient amount of resources being freed on at least one (or some required number) of devices for receiving the temperature-detection service. In other examples, the mapping system 140 may determine, using the system monitor 128, some subset of devices of the sensor network 102 that is/are closest to being able to host and execute the temperature-detection service (e.g., a device(s) that is only deficient in a single area, or by a minimal amount). Then, the mapping system 140 may execute the network reconfiguration logic 148 using only the determined subset of devices.

After reconfiguring/reorganizing the sensor network 102 in this way, the service mapper 126 (e.g., again, in conjunction with the system monitor 128) may determine whether enough devices are now present to satisfy the requirements (538). If so, then the service mapper 126 may perform its normal mapping processes to select appropriate ones of the available devices for deployment of the temperature-detection service thereto (540). If not, then the service mapper 126 again determines whether atomicity is required (542). If not, then, as already described, the service mapper 126 may deploy the temperature-detection service to available devices (544). After which, or if atomicity is required, and since, again by definition at this point in the flowchart 500, there are not yet enough devices to satisfy all of the requirements, then the process continues with a determination of whether component removal is allowed (546). Of course, if the reconfiguration of the sensor network 102 is not allowed (534) earlier in the process, then the process may proceed directly to the determination of whether to use component removal, as shown in the example of FIG. 5. In other implementations, although not shown explicitly in FIG. 5, the flowchart 500 also could proceed directly from non-allowance of requirement reduction (522) to the determination of whether component removal is allowed (546).

If component removal is not allowed (546), then, in the example of FIG. 5, an exception is reached (548) and the deployment may be halted for the temperature-detection service. If, however, component removal is allowed (546), then service components, including entire services, may be removed based on associated priority information (550). For example, the mapping system 140 may execute the component removal logic 150 to determine which services of the sensor network are most easily removed. For example, a given service may have multiple deployed instances (e.g., for redundancy), and the component removal logic 150 may specify that such redundant instances have a low priority and may be removed. In other cases, a given service may simply have a low priority with respect to the business process/logic being performed (such as, for example, a service for detecting an acceleration of an associated chemical drum, when such acceleration is not typically expected, or is not typically expected to be particularly dangerous or problematic).

After removing service components from the sensor network 102 in this way, the service mapper 126 (e.g., again, in conjunction with the system monitor 128) may determine whether enough devices are now present to satisfy the requirements (552). If so, then the service mapper 126 may remove the determined service (components) and then perform its normal mapping processes to select appropriate ones of the available devices for deployment of the temperature-detection service thereto (554). If not, then the service mapper 126 again determines whether atomicity is required (556). If not, then the service mapper 126 may remove determined services/components, if any, and then deploy the temperature-detection service to available devices (558). Afterwards, or if atomicity is required (556), then an exception may be returned (560), indicating that full deployment was not achieved.

Of course, many other implementations are possible. For example, rather than returning an exception (560), the process of FIG. 5 may return to an earlier intervention strategy, such as reducing requirements and/or reconfiguring the sensor network 102. That is, as a result of network reconfiguration and/or service component removal, the reduction of requirements may become sufficient to enable full deployment of the temperature-detection service.

As described herein, service-to-device mapping/re-mapping algorithms enable the automatic intelligent mapping of services to appropriate devices, e.g., smart item devices, so that the services may thereafter be deployed thereto. In some cases, the mapping and/or deployment may at least partially fail, or may be predicted to fail, such that a current deployment condition does not match an allowable deployment condition for the service being deployed. In such cases, a variety of active interventions may be implemented for altering the current deployment condition to obtain a modified deployment condition that does, in fact, meet the allowable deployment condition. For example, such active interventions may include altering the current deployment condition by reducing or eliminating requirements associated with the service or deployment (e.g., service requirements or device constraints), reconfiguring the sensor network to free resources of one or more devices of the sensor network, or removing currently-deployed services (in whole or in part) from the sensor network. Accordingly, a desired service deployment may be obtained in an easy, reliable manner, and a functionality of the sensor network may be made more flexible and more predictable.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method in which a processor executes instructions stored on a non-transitory computer-readable medium, the method comprising:

initiating a deployment of a service onto a device of a sensor network on which a plurality of services are deployed, the device being an operational device within the sensor network;

determining that a first deployment condition of the device which defines at least one constraint of the device in receiving the deployment of the service does not meet an allowable deployment condition for the deployment;

altering the first deployment condition to obtain a second deployment condition that alters the at least one constraint to satisfy the at least one constraint;

determining if the second deployment condition meets the allowable deployment condition for the deployment;

if the second deployment condition meets the allowable deployment condition for the deployment,
deploying the service onto the device, based on the second deployment condition; and if the second deployment condition does not meet the allowable deployment condition for the deployment, altering at least one of the first deployment condition and the second deployment condition to obtain a third deployment condition that alters the deployment of the plurality of services on the devices of the sensor network, and deploying the service onto the device, based on the third deployment condition.

2. The method of claim 1 wherein initiating the deployment of the service onto the device of the sensor network comprises:

initiating the deployment based on a mapping of the service to the device from among a plurality of devices of the sensor network, the mapping based on service metadata associated with the service and on device metadata associated with the device.

3. The method of claim 1 wherein determining that the deployment condition associated with the deployment does not meet the allowable deployment condition for the deployment, comprises:

determining at least a partial failure of the deployment.

4. The method of claim 1 wherein determining that the deployment condition associated with the deployment does not meet the allowable deployment condition for the deployment, comprises:

determining that the deployment condition is associated with a service requirement associated with the service and a device constraint associated with the device; and determining that the service requirement is not met by the device constraint.

5. The method of claim 1 wherein determining that the deployment condition associated with the deployment does not meet the allowable deployment condition for the deployment, comprises:

determining that the deployment condition does not satisfy a deployment constraint associated with the sensor network.

6. The method of claim 1 wherein altering the deployment condition to obtain the modified deployment condition, comprises:

determining that the deployment condition is associated with a service requirement associated with the service and that the at least one constraint of the device includes a device constraint associated with the device; and altering the device constraint, relative to the service requirement.

7. The method of claim 6 wherein altering the device constraint, relative to the service requirement, comprises:

selecting the service requirement from among a plurality of service requirements that are associated with the service, based on a priority assigned to each of the plurality of service requirements.

8. The method of claim 1 wherein altering the deployment condition to obtain the modified deployment condition, comprises:

altering a network configuration associated with the sensor network to obtain the modified deployment condition.

9. The method of claim 1 wherein altering the deployment condition to obtain the modified deployment condition, comprises:

re-locating a service component from the device to another device of the sensor network, to thereby free resources of the device while maintaining a functionality of the service component within the sensor network.

10. The method of claim 1 wherein altering the deployment condition to obtain the modified deployment condition, comprises:

removing a deployed service component from the sensor network.

11. The method of claim 1 wherein altering the deployment condition to obtain the modified deployment condition, comprises:

altering a deployment constraint associated with the sensor network.

12. The method of claim 1 wherein deploying the service onto the device, based on the modified deployment condition, comprises:

injecting the service onto the device; and
activating the service.

13. A system including instructions stored on a non-transitory computer-readable medium, the system comprising:

a system monitor operable to monitor a plurality of devices of a sensor network, and operable to determine device metadata associated with at least one of the plurality of devices, the at least one of the plurality of devices being an operational device within the sensor network; and a service mapper operable to,
initiate a deployment of a service onto the at least one device, based on the device metadata and on service metadata associated with the service, alter a first deployment condition defining at least one constraint of the at least one device in receiving the deployment of the service, to thereby alter the at least one constraint and obtain a second deployment condition that satisfies the at least one constraint, as altered, based on a determination that the first deployment condition does not meet an allowable deployment condition, and alter at least one of the first deployment condition and the second deployment condition and obtain a third deployment condition by altering the deployment of the plurality of services on the devices of the sensor network to satisfy the at least one constraint, based on a determination that the second deployment condition does not meet the allowable deployment condition.

14. The system of claim 13 comprising:

a service repository that is operable to store a plurality of services, including the service, each service including an associated service executable and associated service metadata.

15. The system of claim 13, wherein the second deployment condition includes re-locating at least one deployed service from the at least one device to at least one other device, to thereby free resources of the device while maintaining a functionality of the service within the sensor network.

16. The system of claim 13 comprising:

component removal logic that is operable to alter the deployment condition to obtain the modified deployment condition including removing at least one deployed service from the sensor network.

17. The system of claim 13 wherein the service mapper is operable to execute a partial deployment of the service in response to the determination that the deployment condition does not meet the allowable deployment condition.

18. A service mapper for a sensor network, the service mapper including processor executable instructions stored on a non-transitory computer-readable medium and comprising:

one or more processors;

a mapping system that is operable to cause the one or more processors to initiate a deployment of a service onto at least one device of the sensor network, based on a first deployment condition of the at least one device which defines at least one constraint of the at least one device in receiving the deployment of the service, the mapping system being further operable to determine that the deployment condition does not meet an allowable deployment condition, the at least one device being an operational device within the sensor network; and one or more of requirement reduction logic, network reconfiguration logic, or component removal logic that is operable to cause the one or more processors to, provide the mapping system with criteria for altering the first deployment condition to obtain a second deployment condition that alters the at least one constraint to thereby cause the second deployment condition to satisfy the at least one constraint, as altered, and if the second deployment condition does not meet the allowable deployment condition for the deployment provide the mapping system with criteria for altering at least one of the first deployment condition and the second deployment condition to obtain a third deployment condition that alters the deployment of the plurality of services on the devices of the sensor network.

19. The service mapper of claim 18 wherein the mapping system is operable to execute one or more of the requirement reduction logic, the network reconfiguration logic, and the component removal logic in a pre-defined order until the modified deployment condition is obtained.

* * * * *